US011380118B2

(12) United States Patent
Shaker

(10) Patent No.: US 11,380,118 B2
(45) Date of Patent: Jul. 5, 2022

(54) SYSTEM AND METHOD FOR SENSING WITH MILLIMETER WAVES

(71) Applicant: George Shaker, Waterloo (CA)

(72) Inventor: George Shaker, Waterloo (CA)

( * ) Notice: Subject to any disclaimer, the term of this patent is extended or adjusted under 35 U.S.C. 154(b) by 124 days.

(21) Appl. No.: 15/819,833

(22) Filed: Nov. 21, 2017

(65) Prior Publication Data

US 2018/0322351 A1  Nov. 8, 2018

Related U.S. Application Data

(60) Provisional application No. 62/497,430, filed on Nov. 21, 2016.

(51) Int. Cl.
| | | |
|---|---|---|
| *G06K 9/00* | (2022.01) | |
| *G06V 40/10* | (2022.01) | |
| *G06V 10/143* | (2022.01) | |
| *G06V 40/12* | (2022.01) | |
| *G06V 40/13* | (2022.01) | |
| *G06V 40/14* | (2022.01) | |

(52) U.S. Cl.
CPC ............ *G06V 40/10* (2022.01); *G06V 10/143* (2022.01); *G06V 40/12* (2022.01); *G06V 40/1312* (2022.01); *G06V 40/1341* (2022.01); *G06V 40/14* (2022.01)

(58) Field of Classification Search
CPC ............. G06K 9/00885; G06K 9/2018; G06K 9/00033; G06K 9/00006; G06K 2009/00932; G06K 2009/00; G06K 2009/0006; G06F 21/32; G06F 2221/2105
See application file for complete search history.

(56) References Cited

U.S. PATENT DOCUMENTS

| | | | | |
|---|---|---|---|---|
| 6,411,933 B1* | 6/2002 | Maes | ................. | G06K 9/00892 704/273 |
| 7,750,299 B2* | 7/2010 | Monro | ................... | A61B 5/117 250/336.1 |
| 7,922,659 B2* | 4/2011 | Itsuji | .................... | A61B 5/1171 600/300 |
| 10,459,080 B1* | 10/2019 | Schwesig | .............. | H04W 16/28 |
| 10,503,883 B1* | 12/2019 | Gillian | ................... | G06K 9/629 |

(Continued)

OTHER PUBLICATIONS

McMakin, Douglas et al. "Biometric identification using holographic radar imaging techniques", Proceedings of SPIE, Defence and Security Symposium, 2007, Orando, USA, pp. 1-12.*

(Continued)

*Primary Examiner* — Samir A Ahmed
(74) *Attorney, Agent, or Firm* — Gowling WLG (Canada) LLP

(57) ABSTRACT

A biometric sensor including: a transmitter configured to transmit electromagnetic waves between 1 GHz and 300 GHz; a receiver configured to receive the electromagnetic waves from the transmitter; and wherein the transmitter and receiver are positioned in relation to an object to be scanned such that the receiver receives reflected electromagnetic waves. A method for sensing including: transmitting electromagnetic waves between 1 GHz and 300 GHz to an object; receiving reflected electromagnetic waves from the object; analyzing the electromagnetic waves and reflected electromagnetic waves to determine a characteristic of interest associated with the object.

10 Claims, 21 Drawing Sheets

The radar system enclosure and hand models in full-wave simulation (left) and the system prototype (right)

(56) References Cited

U.S. PATENT DOCUMENTS

| | | | |
|---|---|---|---|
| 2002/0112170 A1* | 8/2002 | Foley | G06Q 20/04 |
| | | | 713/184 |
| 2007/0237365 A1* | 10/2007 | Monro | A61B 5/1171 |
| | | | 382/115 |
| 2009/0281414 A1* | 11/2009 | Feldman | A61B 5/117 |
| | | | 600/409 |
| 2010/0308977 A1* | 12/2010 | Ninomiya | H04B 5/02 |
| | | | 340/10.5 |
| 2010/0321229 A1* | 12/2010 | Dwelly | G01S 7/415 |
| | | | 342/28 |
| 2014/0294251 A1* | 10/2014 | Jo | G06K 9/00033 |
| | | | 382/115 |
| 2016/0012465 A1* | 1/2016 | Sharp | G06Q 20/384 |
| | | | 705/14.17 |
| 2016/0256079 A1* | 9/2016 | Shimano | A61B 90/30 |
| 2017/0097413 A1* | 4/2017 | Gillian | G06F 3/04815 |
| 2017/0193315 A1* | 7/2017 | El-Khamy | G06K 9/00288 |
| 2017/0300735 A1* | 10/2017 | Li | G06K 9/6292 |
| 2017/0365118 A1* | 12/2017 | Nurbegovic | G01V 5/0008 |
| 2019/0257939 A1* | 8/2019 | Schwesig | G06F 3/017 |

OTHER PUBLICATIONS

Moreno-Moreno, M. et al., "Millimeter- and Submillimeter-Wave Imaging Technologies for Biometric Purposes", Proceedings of XXIV Simposium Nacional de Union Cientifica Internacional de Radio, URSI 2009 (2009).*

* cited by examiner

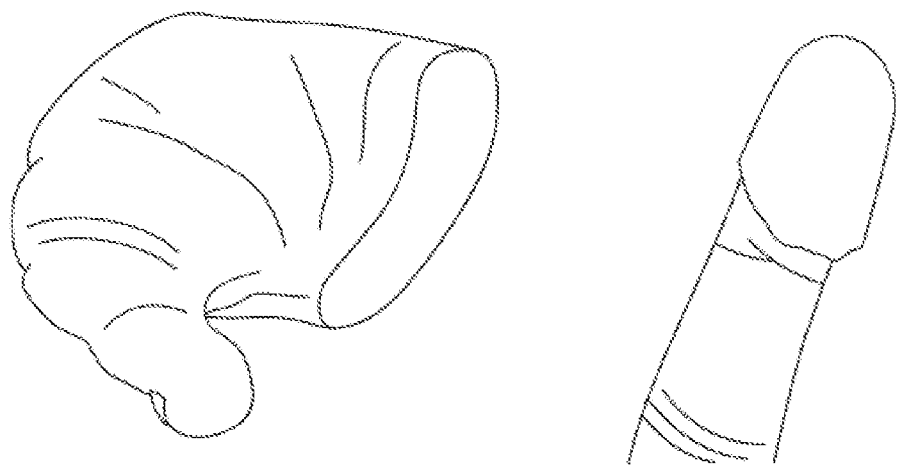
PRIOR ART　　　FIG.1

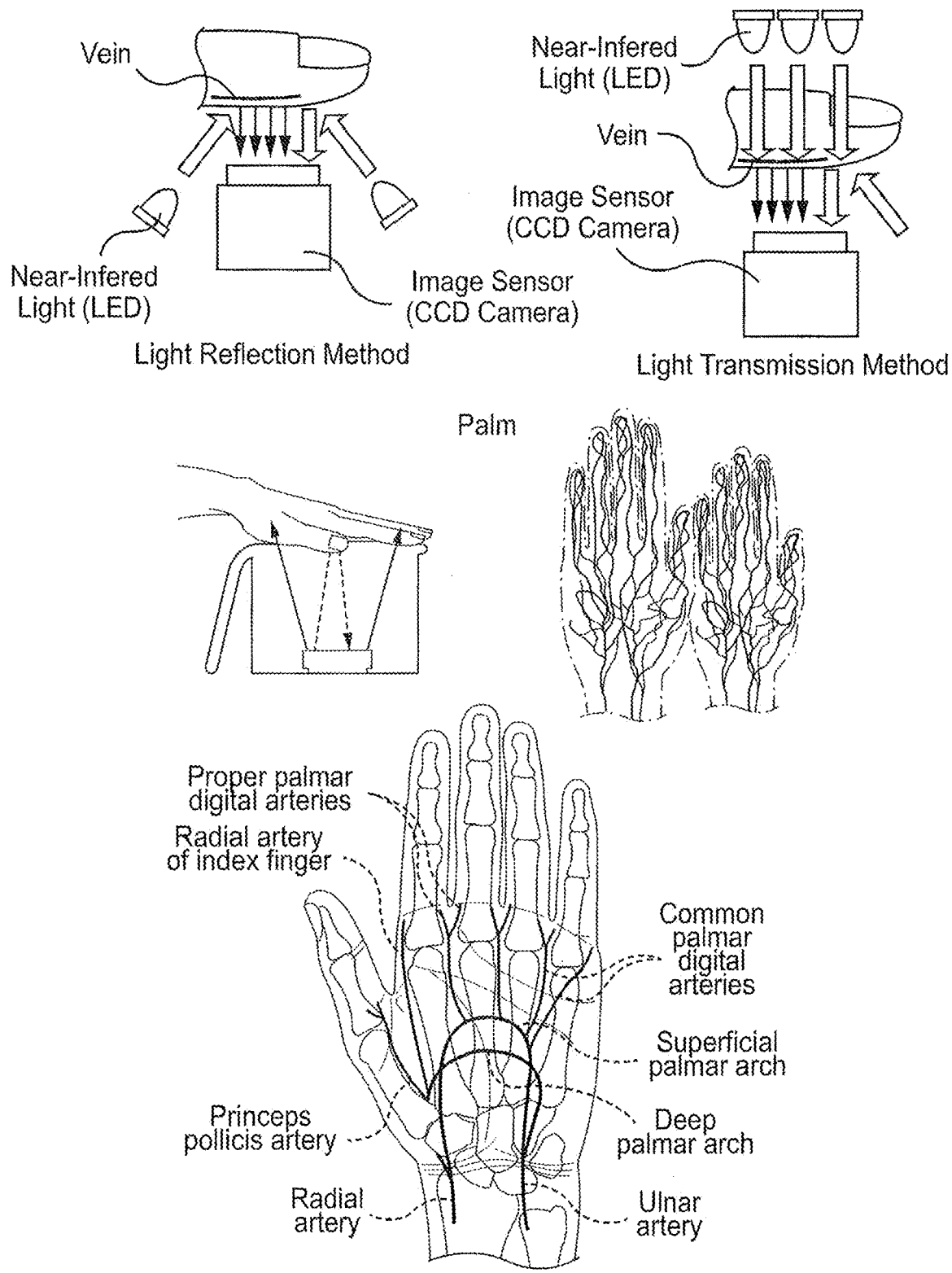
PRIOR ART  FIG. 2

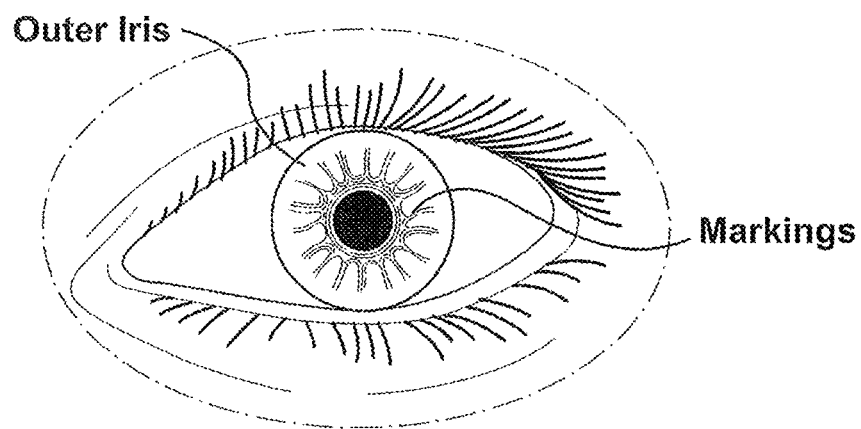
PRIOR ART FIG. 3
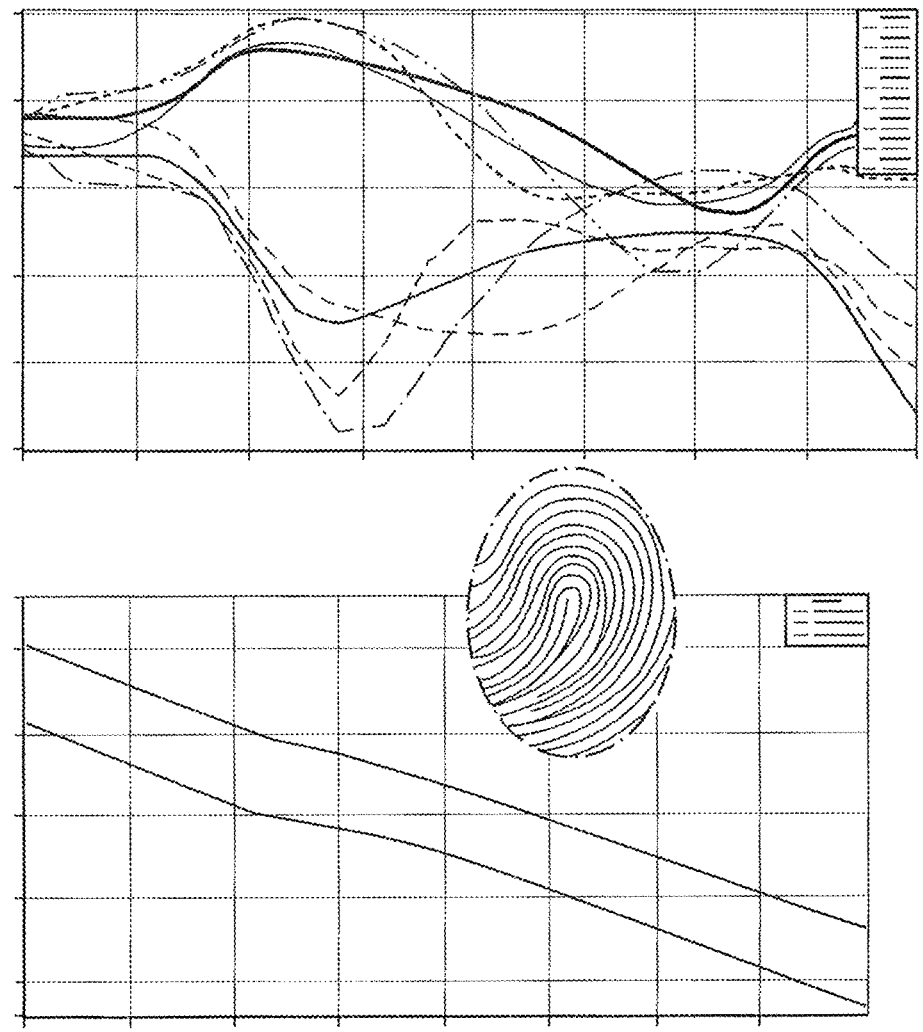
FIG. 4

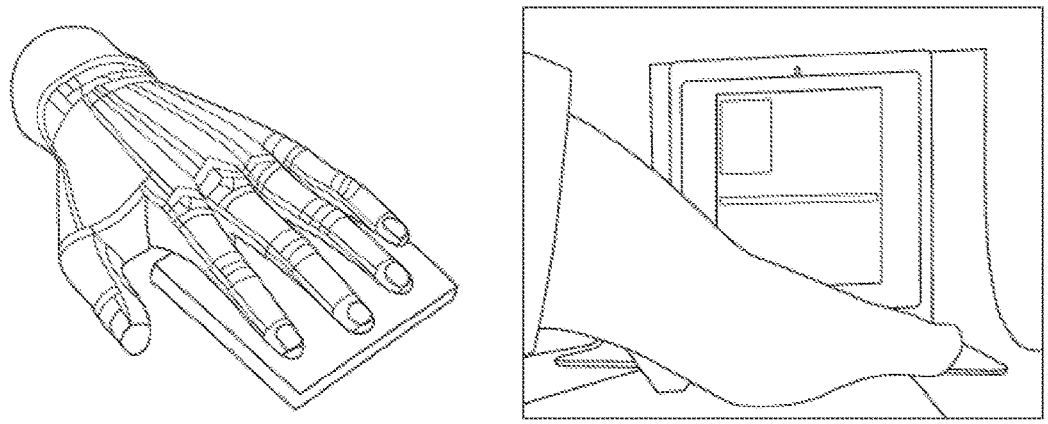
Fig. 7 The radar system enclosure and hand models in full-wave simulation (left) and the system prototype (right)
| | | | | | |
|---|---|---|---|---|---|
| P1 | 86% | 0% | 0% | 0% | 14% |
| P2 | 0% | 87% | 10% | 0% | 3% |
| P3 | 3% | 1% | 94% | 2% | 0% |
| P4 | 0% | 0% | 0% | 100% | 0% |
| P5 | 1% | 6% | 1% | 0% | 92% |
| | P1 | P2 | P3 | P4 | P5 |
True Label / Predicted Label
Fig. 8. The confusion matrix for five different persons

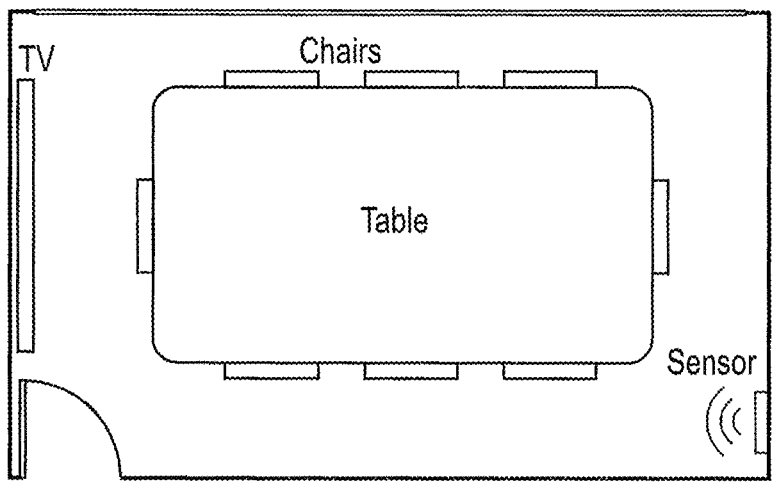
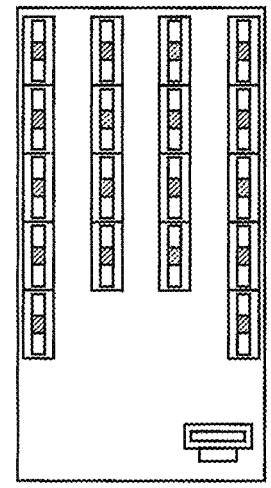
FIG. 9A
FIG. 9B
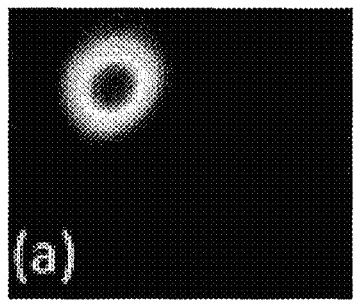
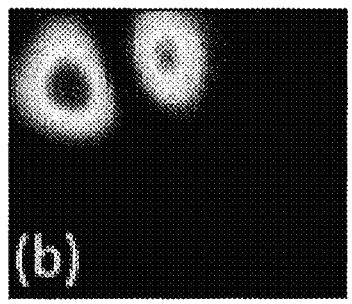
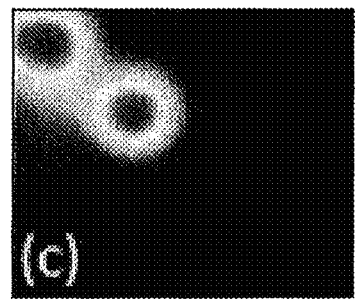
FIG. 10A
FIG. 10B
FIG. 10C
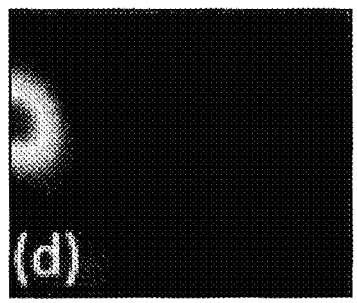
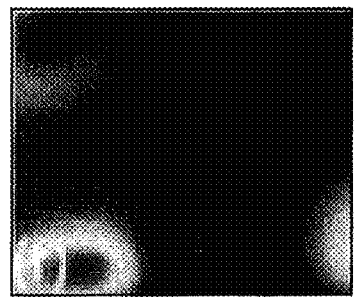
FIG. 10D
FIG. 10E
FIG. 10F

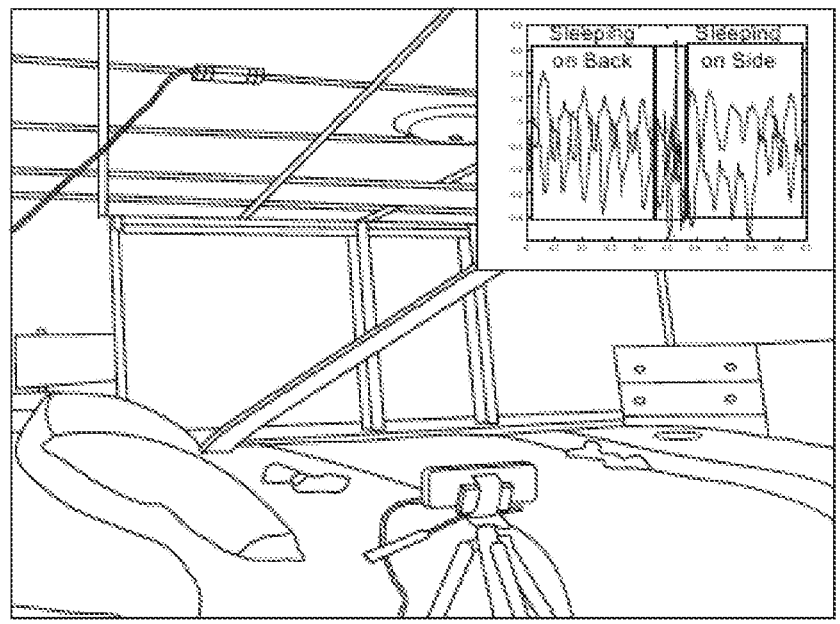
Fig. 11. Setup and extracted radar signal compared with respiration belt.
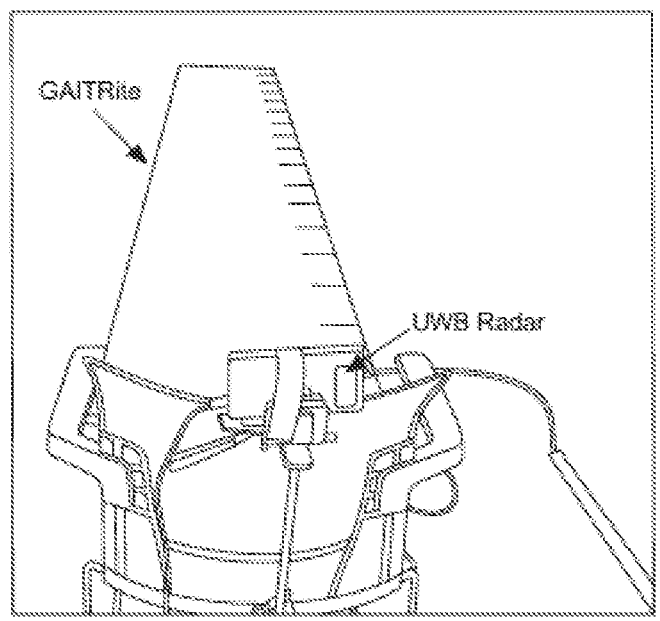
Fig. 12 Experimental Setup

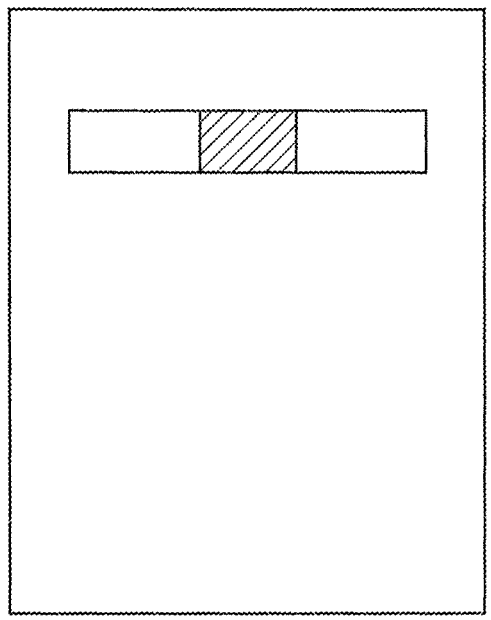 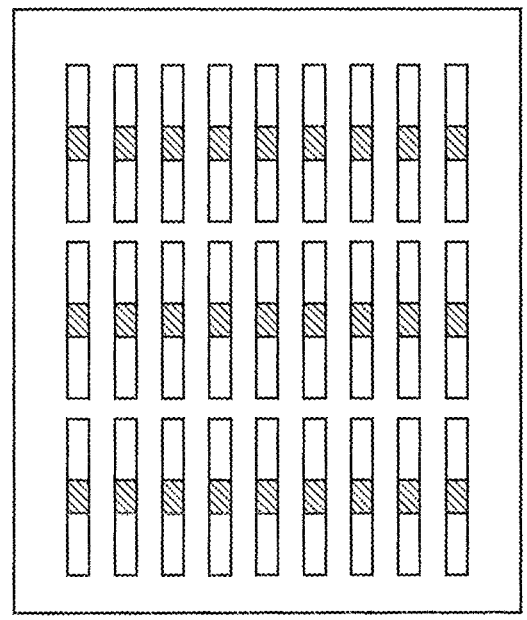
Antenna pair harmonically operated at 60GHz
Antenna array of passive elements with resonant frequency 60 GHz
FIG. 25

SYSTEM AND METHOD FOR SENSING WITH MILLIMETER WAVES

RELATED APPLICATIONS

This application claims priority to U.S. Provisional Patent Application No. 62/497,430 filed Nov. 21, 2016 which is hereby incorporated herein by reference.

FIELD

The present disclosure relates generally to sensors. More particularly, the present disclosure relates to a system and method for biometric and/or environmental sensing using wireless signals at millimeter wavelengths.

BACKGROUND

Various biometric sensing and environmental sensing techniques exist. Conventional studies have examined the possibility of using EMG signals to differentiate between different areas of the human body using wearable input devices. Through measuring electrical signatures on the skin, devices may be able to correctly identify locations like the wrist, stomach, ankle, and hand. However, this technology is affected by blood flow and sweat, both factors that alter electrical resistance. The electrodes required to collect signals are also fairly bulky and may be perceived as intrusive by users.

As the Internet of Things technologies gradually integrate into our daily surroundings, sensors are becoming an increasingly prevalent way of gathering information about the world around us. Biometric systems, for example, can verify the identity of users based on various forms of physiological input. The end goal of this form of authentication is to avoid the less dependable methods of passwords or physical keys with a secure alternative, one that relies on the unique characteristics of a user's biometrics instead of the knowledge/devices they possess. There are many biometric authentication methods that have been extensively studied, ranging from fingerprint scanners to retina sensors to facial recognition software. Of all of these, fingerprinting is likely the most well-known, and has been achieved through a wide variety of methods, whether based on infrared, multiple camera systems, or on acoustic waves. However, all of these have been shown to be open to skimming and identity theft. In most of such cases, criminals can create a fingerprint or finger with identical signature to that of a user fingerprint or the like when exposed to the aforementioned fingerprint scanners (FIG. 1).

Vascular scanners, as shown in FIG. 2, are another type of biometric sensing device. For example, a finger vein scanner or palm vein scanner may utilize near infrared lights combined with a special camera to capture vein patterns. The image is then converted into an encrypted biometric key or mathematical representation and stored as a template. During authentication, the finger vein image is captured, converted again and compared against the stored template of the user.

Palm prints have long been used for criminal and forensic purposes, as the lines and wrinkles of the palm are unique in the same manner to fingerprints. The existing biometric systems that make use of palm prints and palm veins are largely optical-based, which have the same limitations as optical fingerprint sensors.

Issues with vascular scanners have been found, in that they easily fail when a user has certain types of nail polish. They also fail dramatically if users apply skin coloring/tattoos or the like. Another failure mode results from various medical conditions along with extreme weather conditions (i.e. keypads in cold weather).

Iris and retina scanners, as shown in FIG. 3, are another form of biometric sensing. Issues with iris/retina scanners have been noted in that these techniques are cumbersome to users since they are based on optical generated maps. It is also possible to generate contact lenses that fool the authentication system.

Retinal recognition is a more reliable alternative to fingerprinting that makes use of the distinct blood vessel patterns present in the retina. Optical cameras are used to perform this type of biometric authentication, eliminating the need for direct touch and reducing the occurrence of false negatives. However, the scanning process required to obtain the retinal pattern requires the eye to be closely located to the camera, which is not as user-friendly as finger-printing. Moreover, this optical-based identification mechanism is not immune to hacking, skimming, and identity theft attempts.

Other techniques like facial recognition and vein imaging exist, but those have been shown to be easily hackable or often inaccurate; as in the case of users applying tattoos to their hands which alters the acquired infra-red (IR) images for recognition. Amongst the multitude of technologies discussed above, most have shortcomings in terms of ease of use, vulnerability to attacks, or accuracy. Therefore, there still exists a need for a secure, unobtrusive, and reliable biometric authentication method. It is, therefore, desirable to provide an improved sensing system for biometrics and/or environmental sensing.

The above information is presented as background information only to assist with an understanding of the present disclosure. No determination has been made, and no assertion is made, as to whether any of the above might be applicable as prior art with regard to the present disclosure.

SUMMARY

In one aspect, there is provided a biometric sensor including: a transmitter configured to transmit electromagnetic waves between 1 GHz and 300 GHz; a receiver configured to receive the electromagnetic waves from the transmitter; and wherein the transmitter and receiver are positioned in relation to an object to be scanned such that the receiver receives reflected electromagnetic waves.

In a particular case, the electromagnetic waves may be between 30 GHz and 90 Ghz.

In another particular case, the sensor may include a control station configured to analyze the scanned object to determine a characteristic of interest related to the object.

In still another particular case, the sensor may determine whether the characteristic of interest of the object allows authorization of the individual to an application.

In yet another particular case, a second biometric sensor is included to provide an additional check on the characteristics of interest. This approach provides a multi-modal approach to verification of results. In some cases, the second biometric sensor may be selected from a group consisting of an optical sensor, an infrared sensor, a laser sensor, a camera sensor, an ultrasonic sensor or other known sensor.

In still yet another particular case, the object is an individual or animal and the sensor may determine whether the individual or animal has fallen.

In a particular case, the object is an individual or animal and the sensor may determine the stride of the individual or animal.

In another particular case, the object is an individual and the sensor may determine the sleeping pattern of the individual.

In another aspect, there is provide a method for sensing including: transmitting electromagnetic waves between 1 GHz and 300 GHz to an object; receiving reflected electromagnetic waves from the object; analyzing the electromagnetic waves and reflected electromagnetic waves to determine a characteristic of interest associated with the object.

In a particular case, analyzing the electromagnetic waves and reflected electromagnetic waves includes combining the waves to produce an analog signal result.

In another particular case, the method includes converting the analog signal to a digital signal to be further analyzed at a control station.

In still another particular case, the control station may be configured to analyze the signal using machine learning.

In yet another particular case, the control station may be configured to analyze the signal using decision trees.

In still yet another particular case, the method includes measuring the characteristic of interest via a second biometric sensor in order to confirm or verify the characteristic of interest.

In a particular case, the electromagnetic waves may be between 30 GHz and 90 GHz.

In still another aspect of the present disclosure, there is provided a system for environmental sensing including: a transmitter configured to transmit electromagnetic waves between 1 GHz and 300 GHz; a receiver configured to receive the electromagnetic waves from the transmitter; a carbon nanotube (CNT) layer placed on an object; wherein the transmitter and receiver are positioned in relation to the object to be scanned such that the receiver receives reflected electromagnetic waves.

In a particular case, the electromagnetic waves may be between 57 GHz and 67 GHz.

In another particular case, the CNT layer may be configured to detect the presence of a gas associated with the object via a dielectric property change.

In still another particular case, the CNT layer may be made from poly m-aminobenzene sulfonic acid functionalized singled walled carbon nanotubes.

In yet another particular case, the system may be configured to detect ammonia.

BRIEF DESCRIPTION OF FIGURES

Various aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

FIG. 1 illustrates a typical 3D-printed palm and fingerprint;

FIG. 2 illustrates vascular scanner systems;

FIG. 3 illustrates a retina scanner;

FIG. 4 illustrates simulated results for scattering parameters of the system for sensing;

FIG. 7 illustrates the system enclosure and hand models in full wave simulation and the system prototype;

FIG. 8 illustrates a confusion matrix for a 5 person trial;

FIG. 9a illustrates a schematic representation of a system setup;

FIG. 9b illustrates a front side of a compact radar containing a linearly polarized antenna area;

FIGS. 10a-10f illustrate system images illustrating a fall;

FIG. 11 illustrates a setup and extracted radar signal compared with respiration belt;

FIG. 12 illustrates a gait monitoring setup;

FIG. 25 illustrates the antenna according to an embodiment;

DETAILED DESCRIPTION

Figure 5:
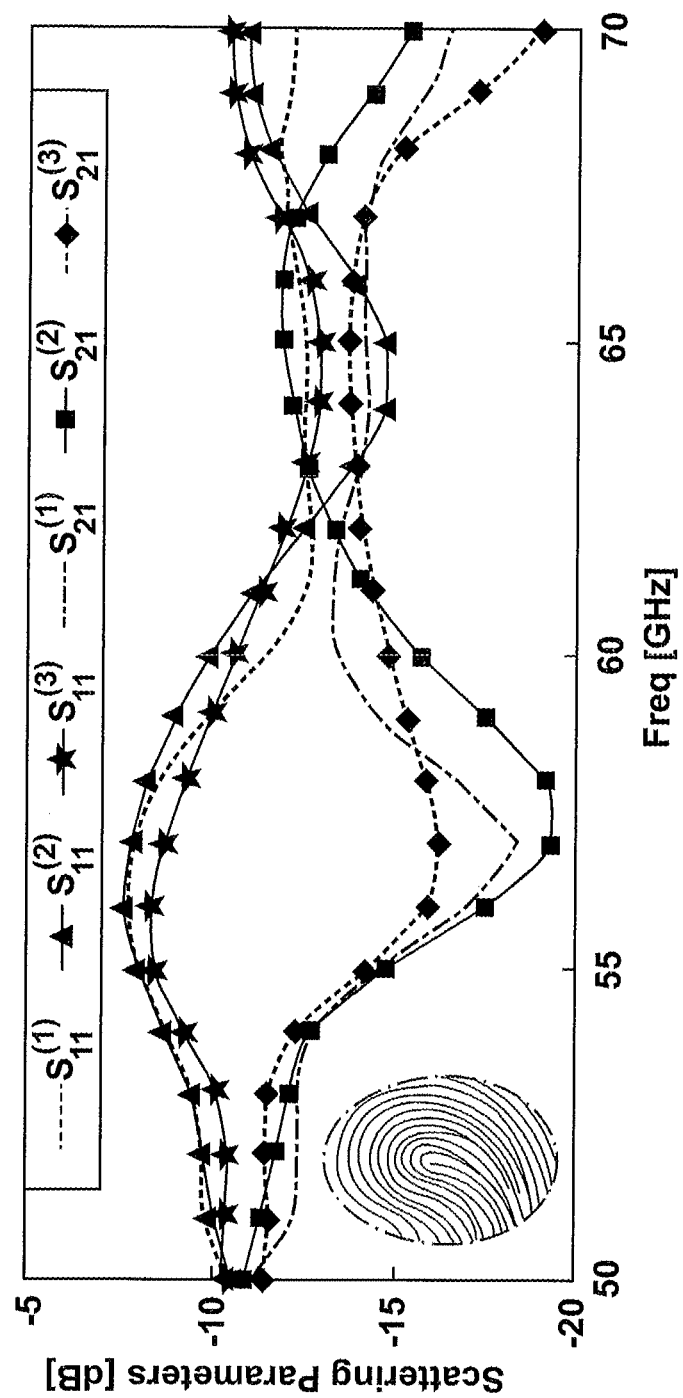
FIG. 5 illustrates HFSS simulation results of different 3D fingerprint CAD models.

Embodiments of the method and system disclosed herein are intended to use a wireless transceiver (for example mm-wave; generally between 30 GHz to 300 GHz). The transceiver will have a transmitter(s) sending a sequence of signals. The signals will be reflected and scattered from an object (for example, a part of the body of a user (for example, a hand, a leg, an eye or other body parts) or an environmental object). The transceiver will have receiver(s) that receive signals reflected and scattered from the object. The system will apply different signal processing algorithms to the received signals in order to identify the object and/or differentiate between various objects. It will be understood that depending on the radar bandwidth and machine learning involved, objects may be in a range of distance from the system. In some cases, the objects may be between a few millimeters to a hundred meters from the system.

As various sensors become more sophisticated, additional authentication and monitoring methods may be useful to, determine further information and to keep information secure in a world where hundreds of technological interactions occur for individuals every day. Biometrics are intended to provide a personal and convenient way of keeping this data secure. Embodiments of the system and method disclosed herein use a type of radar (radio signals) to identify individuals from their fingerprints/palms/eyes/ different body parts or to determine further information about a user. In some embodiments, a high frequency radar (operating anywhere between 30 GHz to 300 GHz) is used as the sensor and data is classified using machine learning and machine intelligence models, which classifies individuals based on their palm/fingerprint/eye radio signatures. At this time, an embodiment of the system/method is able to differentiate between a large set of individuals with very high degrees of accuracy and precision. Embodiments of the method and system described herein may aid in using radar-based fingerprint/palm/retina identification as an independent or an auxiliary form of two-factor authentication (for example, optical fingerprint+radar fingerprint, optical retina/iris scan+radar-based retina/iris scan, or the like).

A problem has been noticed with identifying and authenticating users without using a wearable device (like using RFID, NFC, HeartID). Available biometric identification mechanisms like fingerprinting suffer from skimming. Embodiments of the millimeter (mm) wave system and method disclosed herein are intended to solve these challenges through 3D biometric identification. Every person has distinct fingerprints. In addition, the shape of every finger and hand combination is distinct. Unlike optical recognition, which in a sense relies on 2D data, mm-waves can resolve fingerprints and handshapes, essentially creating a 3D scattered image of the hand that identifies an individual distinctively. The system provides for a 3D scattered-enabled image that is not a mere 3D structure/shape based image, but also takes into consideration the electrical/magnetic material properties of skin and/or underlying veins and the like.

Radar, short for "radio detection and ranging", has traditionally been used to detect the location and movement of objects. This is achieved through the emission of electromagnetic radiation and measurement of the waves that are reflected back. Doppler radar can be used to detect the velocity of an object that is being measured, whereas the range can be calculated based on how long it takes for the waves to be received by the sensor after they are transmitted. Depending on the angle of reflection and the degree of refraction that has occurred, it is possible to determine properties regarding the material composition of the object.

In a biometric situation, skin thickness, fingerprint patterns, human blood composition, and hand/fingers shape affect the reflected wireless signals incident on them. Choosing a very low frequency, for example a frequency less than 1 GHz, the resolution may not be enough to discriminate simultaneous different features of individuals (for example, skin electrical properties, veins, finger/palm print). Using the proper frequencies, one may penetrate through the skin, and "see" the surface/inside of a human being. Since the inside features of every human differ, and since skin thickness, fingerprint pattern, palm pattern, eye ball, and, their composition will have different RF properties at different frequencies (different from one individual to another), an algorithm may be used to look at multiple subtle differences at multiple frequencies to identify individuals.

The multitude of features the system may use for identification also helps define versatile likelihood metrics which in turn address different possible temporary variations in some of them (for example, vein contraction, wet skin, and the like).

In a specific study, the system was able to identify a group of 10 individuals with more than 95% accuracy. Pairing the system with another biometric technology such as fingerprinting yields 100% identification accuracy with a high level of safety against skimming/identity theft.

In this example, 3D fingerprint and palm models were created in electromagnetic numerical simulators to illustrate operational principals of the system. FIG. 4 illustrates the simulated results (50 GHz-70 GHz) for the scattering parameters (magnitude and phase) of 3 different fingerprints+one rotated fingerprint relative to an RF/mmWave Tx and Rx antennas. It is clear that each case generates distinct scattering parameters. This is based on subtle variations in the skin shape. Changes in skin electrical parameters and veins underneath will add to the richness of identification.

Embodiments of the system and method detect and collect the signals. The collected signals are then processed. The signals depend on the specific geometries of the fingerprint/ palm, plus the skin electric/magnetic properties and all of the underlying veins/bones. Based on the levels of diffraction, refraction, and reflection occurred, a signal processing algorithm is used to classify the data to determine whether the hand detected belongs to a specific user or not.

In a method for sensing, the data may first be generated by the radar/radio sensor. The data is sorted and certain set of algorithms are applied, for example AI, Machine learning, or the like. Then, a decision tree is generated and the individual or object is identified.

In some cases, the following may be radar generated data:
1. IQ
2. Range
3. Acceleration
4. Energy Total
5. Energy Moving
6. Velocity Dispersion
7. Spatial Dispersion
8. Energy Strongest Component
9. Movement Index
10. Fine Displacement The system may include an input device, for example, a pad, glove, screen, or the like, where users place their hands/fingerprints or gaze with their eyes and get identified/ authenticated. Note that no direct contact to the sensor is necessary. Use of rf and/or mm-wave and/or THz radio(s)/ radar(s) is used identify/authenticate individuals.

One application of a secure, reliable radar sensor that can distinguish between individuals would be for two-factor authentication when combined with another biometric method. For example, current fingerprint sensors on smartphones are vulnerable to security attacks, as they can easily be manipulated with a stolen fingerprint. Unlike capacitive sensors, radar cannot be easily bypassed using a rubber replica of the fingertip made with a 3D-printed mold. Embedding a small radar sensor chip beneath the outer shell of the smartphone could add a second layer of protection from hackers, requiring the palm signature of the user to match as well as the fingerprint. A similar system could be implemented in laptops, logging the user into their account when they place their palm down next to, for example, the trackpad. Other applications may include: door security, border security agencies, large corporation security, laptop access security, and the like.

In other scenarios, a palm signature based system could be more accessible and convenient than a fingerprint based one. Fingerprint sensors require the user to position their finger carefully over a small sensor, which can be inaccurate at times if misalignment occurs. A radar sensor, however, can be entirely covered by the palm and therefore may be less sensitive to changes in positioning. A possible application of this would be in a door handle, where the user could unlock the door by placing their hand over the embedded radar sensor, which would be more natural than finding a specific location to press their finger. Another case where it would be convenient to have a palm-based system would be inside the steering wheel of a car, where it is again natural for the user to cover the sensor with their entire hand.

There are many other possible implementations of a radar biometric authentication system, the number of which will increase as the technology becomes more sophisticated. As radar has the ability to work through different materials, future applications can involve natural integration with various Internet of Things technology. This would enable users to more seamlessly interact with the world around them.

Research has been done on using mm-wave sensing for imaging as well as for use in mmIDs (which is a higher frequency version of Radio Frequency Identification RFIDs). Conventional mm-wave imaging typically requires a cumbersome setup (since the technology typically seeks probing deep into the human body), while RFIDs/MMIDs would require users to wear/possess some hardware for identification.

Alongside with fingerprints, palm prints have also long been used for criminal and forensic purposes. Moreover, the veins beneath the skin are also unique and present a higher level of security is used as identification. The existing biometric systems that make use of palm prints and palm veins are largely optical-based, which may have similar limitations as optical fingerprint sensors. However, noting that there are approximately 2,700 ridge "units" per square inch of friction skin, with an average ridge separation of 0.020 mm to 2 mm, and an average ridge breadth of 0.45 mm, and noting that the finger pad skin of a human has three distinct layers: epidermis (ranging from 0.5 mm to 1.5 mm), dermis (ranging from 0.6 mm-3 mm), and subcutaneous tissue (which varies significantly depending on the fat tissue). It has been determined that mm-waves are able to sense such a multitude of minute differences and possibly help in identifying individuals. This is mainly because at 60 GHz, the free space wavelength is 5 mm. Considering the nominal dielectric constant of a uniform skin layer, the guided wavelength is about 1.5 mm which is comparable to many of the outline palm/finger features outlined earlier, indicating possible satisfactory resolution to distinguish among different individuals.

In an example, set of 3D CAD of human fingerprints were created and imported into a full wave electromagnetic simulator (Ansys HFSS). As a simplification, all of the models had the same uniform dielectric properties to observe if the different fingerprint patterns may be electromagnetically observed. Two horn antennas were placed 6 mm above each fingerprint model, one as a Tx and the other as an Rx. The scattering parameters for each case were calculated. In the range of 50 GHz to 70 GHz, as can be observed in FIG. 5, it is clear that the magnitudes of S11 and S21 are distinctively different among the tested cases. This is also true for the observed reflection/transmission phases and group delay signals. Slightly changing the dielectric constant/uniformity of the 3D fingerprint models resulted in even more significant differences. This simplistic—yet computer intensive—set of simulations demonstrated that mm-wave biometric identification may be used.

Figure 6:
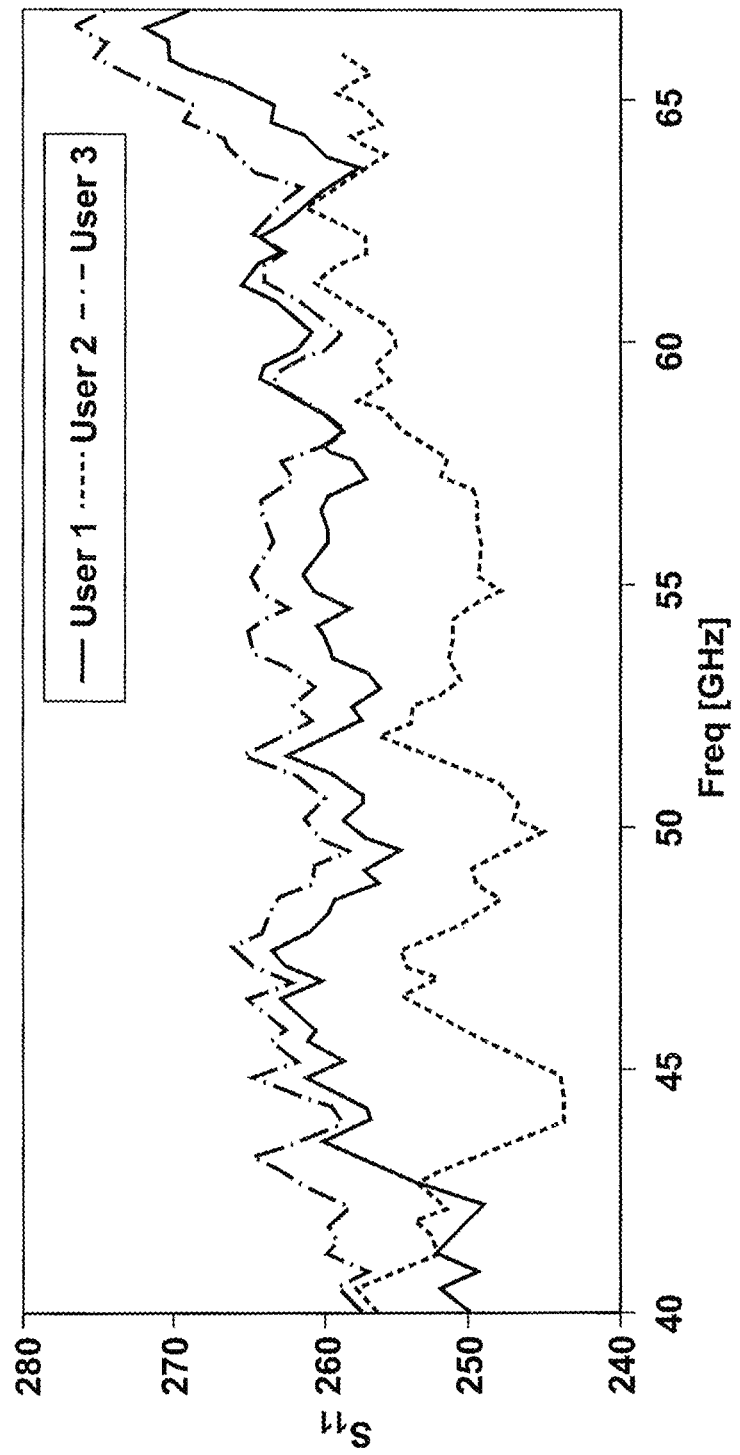
FIG. 6 illustrates unwrapped reflection phase at port 1 for 3 different users.

In another example, a set of measurements using Keysight N5227A PNA-67 GHz four-port Microwave Network Analyzer was simulated. Each port was fitted with a WR-15 horn antenna. A transition from waveguide to 1.8 mm connector was used to interface the horns with the VNA. The location of the horns was fixed and a number of volunteers placed their hands in a fixed position relative to the horns. Measured scattering parameters data showed that each user can be clearly distinguished. FIG. 6 illustrates the unwrapped reflection phase at, port 1 of 3 different users. The magnitude, phase, and group delay responses at all ports (whether reflection or transmission) were clearly distinguishable.

Both simulations and basic RF measurements highlighted a few clear conceptual challenges. For example, the scattering parameters clearly differ depending on the relative position between the finger/hand and the horn antennas. In addition, measurements with various positions/hands showed that the dermis layer and subcutaneous tissue contribute significantly to the observed scattering parameters. Accounting for such issues may necessitate increasing the available number of channels (Tx to Rx) along with applying some innovative signal processing/machine learning algorithms to help identify individuals in a realistic scenario as detailed herein. More channels may provide for more detailed results but may also increase the cost of the system.

In an embodiment of the system for sensing, an 8 channel (2Tx, 4Rx) monostatic radar device using frequency-modulated continuous wave (FMCW) operating in the 57-64 GHz range was used. The radar is packaged in a flat surface box where the distance from the surface of the eight printed planar antennas to plastic enclosure top is 6 mm. In other cases, the system may include wearable radar with antennas placed directly on the skin. The radar system was utilized in two steps: first, the training phase, where users were instructed to place their hands on top of the enclosure. At each hand placement, the signal is recorded from each hand in straight and slightly angled positions (clockwise and counterclockwise rotations of approximately 5 and 10 degrees) for a total of 10 unique sets of data points. This was done to allow for the classifier to ignore the noise generated from slightly different hand positions. The users were also instructed to press their palm down on the enclosure to allow full contact. However, the users were allowed to shift their hands slightly during the recording of data, to mimic natural user behavior when using typical biometric authentication methods, and also to train the classifier to recognize and handle slight movements. The collected data points were all labelled under each user for use in supervised machine learning, which was performed while the training process took place. Next, once the training part was completed, users randomly placed their hands for identification.

In this work, the classifier algorithm used to build the initial model for our hand identification system is a random forest, which is a set of regression trees taken together to classify complex data points into discrete categories. Each tree comprises of a series of branching classifications based on randomly selected features. When several trees are taken together, the most popular predicted outcome is taken as the classifier for the data point.

At each hand placement, 512 features (8 channels×64 data points each) were collected plus the average, absolute value, root means square, global maxima and minima of the signals from all channels, resulting in a total of more than 600 features. The processed radar signal streams included range, overall hand acceleration, the total energy received from the returning radar signal, energy measured from moving targets, velocity dispersion, spatial dispersion, energy strongest component (the measure of the energy reflected from the target with the largest radar cross section), movement index and fine displacement, along with the IQ data for each channel. Note that despite the fact that the measurements were done in a stationary mode (placed hand), some radar metrics were used to ensure validity of the measurements and minimize training errors (for example, recording data before the hand is placed properly).

In this example, the radar sensor was operating at −10 dBm (0.1 mW) RF output power using antennas with 6 dBi of gain. Ignoring attenuation by the plastic material itself, and considering the distance from the sensor top to plastic enclosure top (6 mm), the power density at the surface is maximum at 0.9 W/m2 (in the direction of maximum transmission) which is significantly lower than the FCC safety limit of 10 W/m2. Given that the system is operating at about one tenth of the safety limit, and given that users need to place their hands for mere seconds for identification, it is believed the system is fully safe to use in commercial applications.

In general, users do not need to place their hands directly on the packaged system. A touch-based system was used as it serves two purposes: minimize hand position variations when compared to allowing users to try to hold their hands still in the air, and minimize the radiated power requirements (since the power transmitted needs to be higher as the distance between the user and the device increases, which could be an issue when considering safety limitations).

The initial set of trials were conducted using two individuals, with both their left hands and right hands. Three classes were labelled in total: no hands, hands of individual one, and hands of individual two. The training of a "no hands" class was included for the model to become accustomed to the inevitable degree of background noise and clutter. The data was labelled during collection and analyzed using the random forest classifier. In the trial, a more than 98% accuracy in identification. FIG. 7 demonstrates a sample test case, where a user places her hand on top of the compact-size radar system, which is connected to a laptop via USB for data processing and visualization. After the initial phase of training, which takes about 1 minute of total time, the system can identify a user within seconds of placing her hand (each user was granted a different color ID on the computer screen for visualization).

The trial was expanded to a large number of individuals, achieving a consistent accuracy in the high 80s. All individuals are undergraduate students, ranging from 18 to 22 years old, and hailing from more than 20 different countries. FIG. 8 lists the confusion matrix for five different persons (P1 to P5). The list of five persons include a Canadian female, a Canadian male, a Chinese-Canadian female, an Indian-Canadian female, and a Korean-Canadian male.

In another example, the system for sensing may be used to detect falls. Falls are the leading cause of severe injuries among seniors according to a report by the Public Health Agency of Canada: these injuries include hip fracture, traumatic brain injures (TBI) and upper limb injuries. Approximately, 28-35% of seniors over the age of 65 fall every year, where 47% are unable to get up without help and nearly 5-25% require immediate medical attention. Consequently, there is a growing need for the development of wireless human activity recognition systems to address this major public safety concern. This system is intended to use similar radar hardware as detailed above.

To-date, fall detection and other human activity recognition have been approached through two different methods: wearable and non-wearable technologies. A wearable device for the purpose of detecting falls typically involves an accelerometer and/or a gyroscope and functions by measuring the change in velocity along the vertical axis. Most of the available wearable devices rely on wireless communication (e.g. cellular, WiFI, Bluetooth) to transmit data, which require relatively high power consumption to function properly. Similarly, Radio Frequency Identification (RFID) wearable systems have also been developed, which operate by tagging everyday objects and then associate them with specific activities. Consequently, it requires the user to wear a bracelet with integrated RFID. The most significant drawback for these technologies is that for a device to work accurately, the user is required to carry it around constantly. Notably, the effectiveness of wearable sensors was tested with a group of seniors over 90 and it was found that in the incident of a fall, 80% did not receive immediate help because they were not wearing their fall detector devices at the time. Evidently, wearable technology is not psychologically optimal for the purpose of activity recognition and fall detections among senior citizens.

On the other hand, considerable work has been done recently to explore the realization of wearable-free fall-detection sensing systems, which include microphone arrays, floor vibration sensors, camera-based sensing, and the like. However, most of these systems are limited in one way or another. For instance, acoustic based systems lack the ability to successfully differentiate between the environment noise and interference, leading to low specificity. Floor vibrations sensors are relatively inexpensive, but they only perform optimally with certain types of floors. Camera-based systems compromise the privacy of the user, cannot provide accurate data in low light, require a field of view and are costly to set up and maintain. Therefore, there is a growing demand for a device-free, non-invasive activity detection system, which may be used for monitoring activity among seniors and other individuals.

To address the aforementioned challenges of current wearable-free technologies for fall detection, the system may include Radio frequency (RF) radars to develop a device-free, non-invasive fall detection system. Radar technology is appealing in terms of tracking every day and/or abnormal motions (e.g. falls) as it can provide large area coverage, does not require a line-of-sight (which is highly favorable for addressing privacy concerns), and is device-free. Higher frequency radars may be advantageous because they can detect small objects and movements with high resolution. They accomplish the task of motion detection by sensing changes in the electromagnetic (EM) properties of the environment, which can be triggered due to a moving person or object. At the basic principles of the proposed system, the radio source emits an EM wave that is released to interact with the environment. By analyzing the returned signals, and invoking artificial intelligence and machine learning algorithms, the system can be used to detect if motion or a fall occurred.

To validate the system for fall detection, experimentation was conducted using a low-cost ultra-wideband (UWB) radar. The system included an 18-element linearly polarized antenna array that operates in the frequency range of 3.3 to 10.3 GHz. The radar was housed in a 14 cm×7 cm×1 cm box, and placed at a height of 1.7 m, in a 3 m by 5 m room according to the schematic shown in FIG. 9.

The recorded results from a single person fall detection test are presented, through six different time-lapse images in FIGS. 10a to 10e: the time interval between (a), (b) and (c) is 4 s, while the last three were taken within one second. The radar can rapidly scan through the breadth and depth of the room forming a 2D cross-section heat-map of the room along with a range map (not shown) for the third dimension. To ensure that background reflections from the room furniture do not clutter the image, the radar performs an initial calibration before a person enters to room. This calibration is intended in distinguishing furniture scatters (table, chairs, wall-mounted TV, and walls) from scattering due to the presence of a human being. A person then walks into the room, and their motion can be observed in FIGS. 10a-c. The dot specifically illustrates that the person is at the other end of the table, opposite to the side where the sensor was placed. Artifact dots sometimes appear depending on the person's position and possible multi-reflections and multi-scattering due to the interaction between the person and the nearby furniture (See FIGS. 10b and 10c for example). At the 8 s mark, the person is still observed to be moving, since the placement of the right dot in (FIG. 10b) has changed to that in (FIG. 10c). The person then loses his balance at the end of the 8 second mark, and the actual fall is recorded in the last three images.

It is important to note that the dot is observed to be rapidly lowered, implying the change in the person's vertical position. The fall occurs within the span of one second, and the last three images in FIG. 10 were captured in this timeframe. This simple illustration outlines the systems capability of monitoring the motion of a person in a furnished room as well as successfully detecting a fall using a wall-mounted UWB RF radar.

The results above indicate that the proof-of-concept system is capable of detecting stationary objects, along with tracking motion, as well as successfully detecting falls for a single person. By incorporating machine learning into the signal processing of the radar data, it may be possible to detect falls in a group of people; for instance, in a large common area at a nursing home.

In another aspect, the system may be used to provide sleep monitoring. Obtaining sufficient sleep is a necessity for every person. Sleep deprivation can cause significant harm to a person's mental and physical health through symptoms such as fatigue, reduction of cognitive function, and deficits in memory. As people grow older, they become more at risk of suffering from many health issues, such as restless leg syndrome and sleep apnea. The latter is a disorder that is defined by an involuntary pause in breathing which reduces the quality of their sleep and may lead to coronary heart disease, hypertension, and diabetes. This makes sleep monitoring an important tool in geriatrics.

Different approaches to monitoring sleep were developed throughout the years. A gold standard device for diagnosing sleep issues has been the polysomnography (PSG), which involves attaching many electrodes using wires. This includes multiple tests such as the EEG, EOG, ECG, and EMG. This procedure is expensive, distracting, uncomfortable, and could cause skin irritation. This makes the PSG unsuited as a device for long term daily sleep monitoring at homes and elderly housing facilities. Numerous technologies are being investigated as an alternative. Wireless sensing utilizing radars has been demonstrated as a viable solution. However, many of the presented systems to-date are either bulky or costly ones. Moreover, most of them rely on a limited transmit-receive configuration (i.e. 1 Tx to 1 or 2 Rx) which limits the system use to well-defined lab settings rather than complex arbitrary bedroom environments (in terms of furniture settings and decorations).

In this system an UWB radar (3-10 GHz) chipset capable of driving 18 antennas in multiple transmit-receive configurations was used. It will be understood that the system may use different frequency to suit different applications. This was intended to allow the system to easily account for various background clutter in typical home settings. In addition, the extensive antenna setup allows for monitoring chest movements and leg movements. The overall system cost is about $300 USD and is about the size of a 5" smart phone. The radar system may be controlled by a small computer, and the data may be sent to a server for off-line processing.

In the experiment conducted, the system included two radars placed in an orthogonal manner with respect to a bed in a retirement home bedroom; one system was placed on the ceiling, while the other was placed by the bedside. This configuration was intended to ensure monitoring a person while sleeping in all possible positions. The data was relayed to a server for offline processing. FIG. 11 illustrates the setup and shows a sample of the recorded data. The subplot in FIG. 11 shows a comparison between the radar data and a respiration belt when a person is sleeping on the back, then moving to a side-sleeping position. The system was tested with 3 female volunteers and 4 male volunteers. Different sleeping positions were tested. Accuracy of 90% or better was achieved in detecting the breathing rate in any sleep position, in-sleep motion, along with any abnormalities in the breathing pattern.

In a further aspect, the system may be used for monitoring individuals' gaits. Assessment of gait velocity can provide crucial information regarding cognitive function as well as an early diagnostic of cognitive decline, dementia, fall risk, and early detection of illness or change in health. Gait velocity evaluation is included in geriatric assessments, which are currently performed by a physician or a trained individual during clinical visits. This leads to infrequent assessments and may not result in an accurate representation of a person's cognitive function. Continuous monitoring provides an opportunity for early interventions and risk detection in a more frequent manner.

There is an increasing amount of new technologies that are being developed to continuously monitor older adults at home without the need of physicians or experts. These technologies include wearable accelerometer and gyroscope based devices, Kinect (Camera-based), and passive infrared motion sensors in the home. As privacy in the home is a concern for older adults, they prefer not to use camera-based systems. Wearable devices necessities charging and maintenance, which is not convenient or feasible for many people, especially those with dementia.

A wireless non-wearable monitoring system is one approach that overcomes many challenges related to smart home monitoring. It can facilitate unobtrusive continuous wearable-free gait measurements, in addition to monitoring other bio-vitals, motion activities, and the surrounding environment while adhering to privacy concerns. In this example, a gait velocity tracking system using an UWB radar is presented; the experimental setup, methods and approaches used to measure gait speed. A comparison between the accuracy of speeds measures from the radar and a gold standard mat (GAITRite), are presented and a quantitative analysis of the comparisons.

The developed gait velocity tracking system utilizes an UWB radar sensor in the frequency range of 3 GHz to 10 GHz. It has an algorithm for target detection that is essential for tracking movement. The radar is intended to abstract the whole body as one object and provides information about the location of the person relative to the UWB radar. The processing incorporates clutter removal which separates the reflected signal off the person being monitored from static objects in the experiment area. By using this object detection feature, location data is extracted in Cartesian coordinates along with the time at that location. The gait velocity can be calculated with time and the z coordinate for each walk performed (where the z-axis represents the vector perpendicular to the plane of the radar placement).

A study was performed to quantify the accuracy and reliability of a simple tracking algorithm using UWB radar for the determination of gait velocity. Six volunteers, consisting of one female and five males between the ages of 18-40, participated in the experiment with the GAITRite system as a ground truth reference versus the UWB radar system.

The participants were asked to walk at slow, normal and fast speeds relative to each individual for a distance of 5 m away from the radar, turn around and return to the starting point. The walking segment is shown in FIG. 12. In total, 36 walk segments were collected from 6 participants. Half of the walk segments are towards the radar direction while the other half are away from the radar. The number of test runs for slow, normal and fast speed walks are the same in either direction for each participant. Velocity obtained from GAITRite mat was used as ground truth for comparison.

The gait velocities obtained from the tests cover a variety of velocity ranges from around 50 to 150 cm/s. The group of experiments was designed to test the UWB radar with different walking sets for the potential application of elderly indoor environment monitoring.

Figure 13:
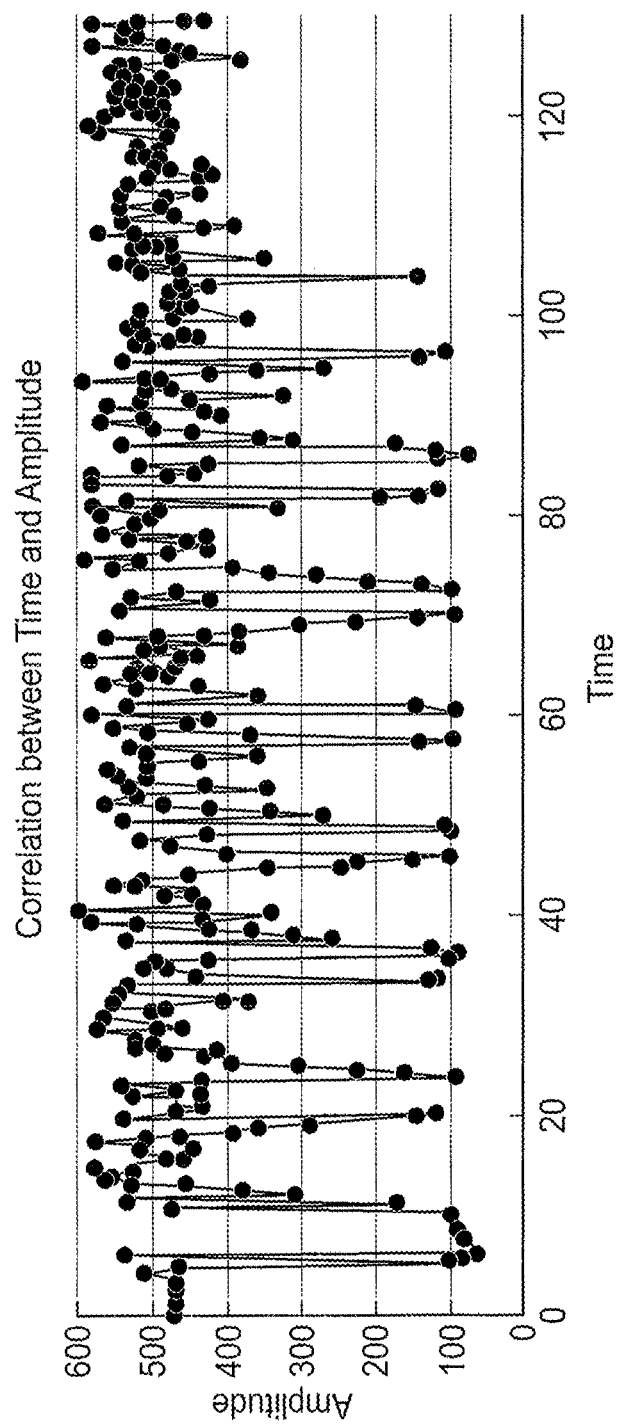
FIG. 13 illustrates the correlation between time and amplitude as a person walks back and forth.

FIG. 13 shows the amplitude of the signal received by the radar with time as a person walks towards and away from the radar multiple times. As expected, the amplitude scale follows the expectation that when a person is closer to the radar, the signal strength is much stronger and as they move away from the radar, the signal strength weakens.

Figure 14A:
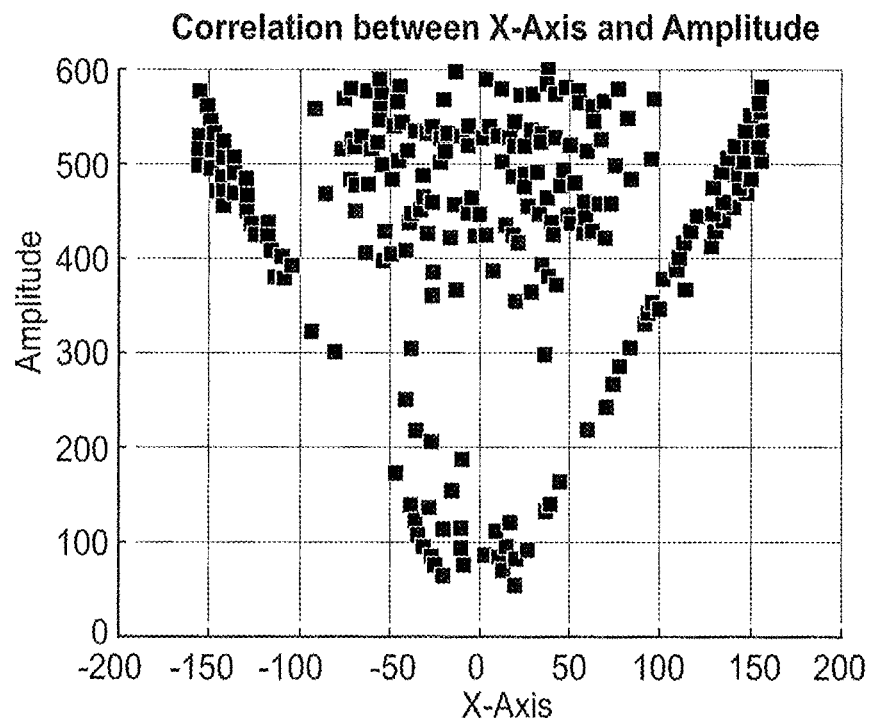
FIGS. 14a and 14b illustrate the X-Axis and Y-Axis vs. amplitude over time.
Figure 14B:
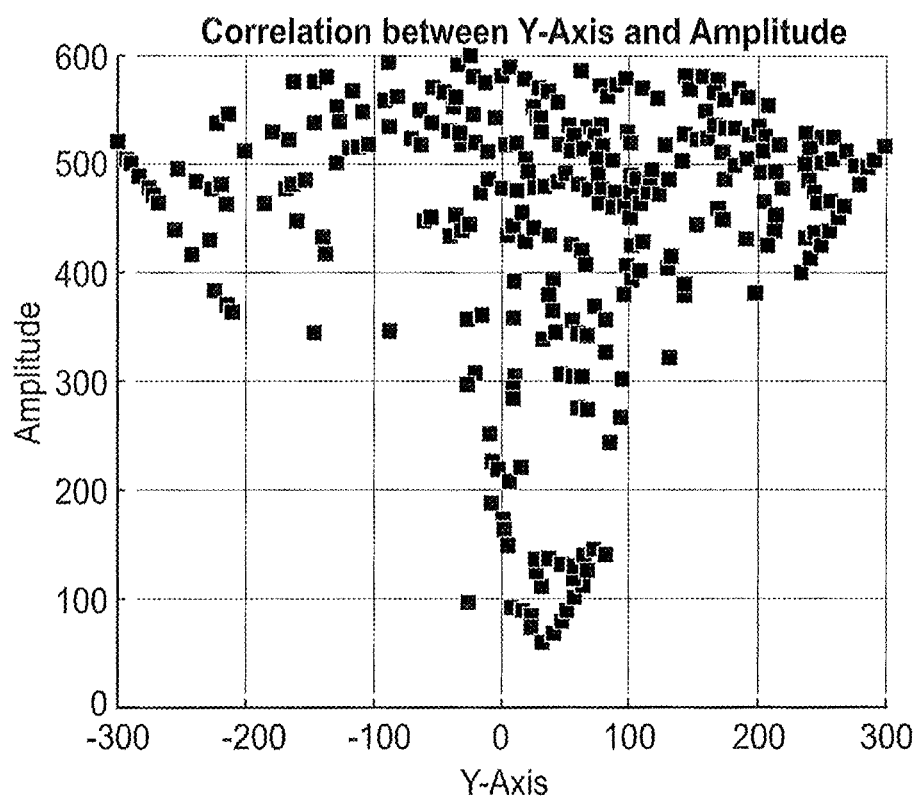

The radar is capable of detecting 3D objects using a 3D Cartesian plane. As mentioned previously, the z-axis provided the distance value between the radar and the person being tracked. To keep the experiment simple, only velocity along the z-axis was taken into consideration; namely, the direction giving the distance of the person from the radar in a horizontal line. FIG. 14 shows the amplitude of the received signal by the radar with time across the x-axis and the y-axis. One can observe the field of view of the radar through these plots. It is also possible to use these plots in assessing the exact step position of the person walking, which may help assess other cognitive functions.

Figure 15:
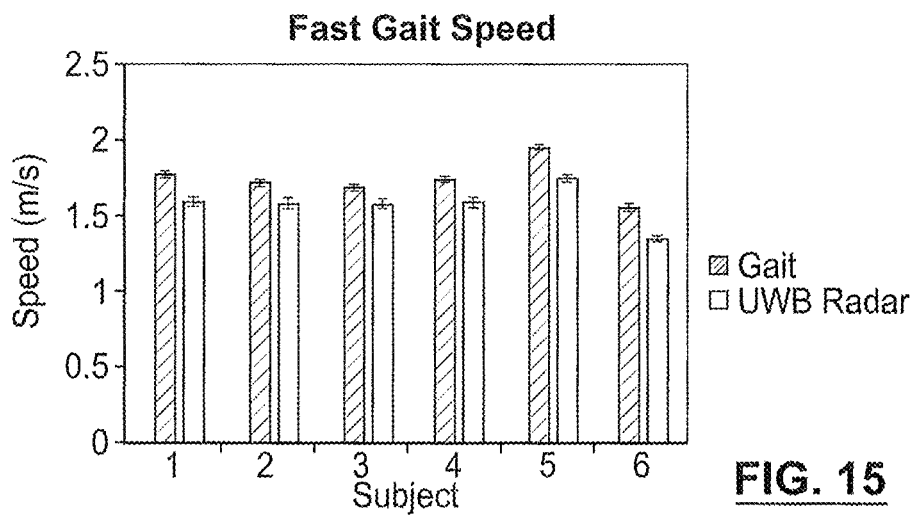
FIG. 15 illustrates the mean and stand variance for fast gait speed.
Figure 16:
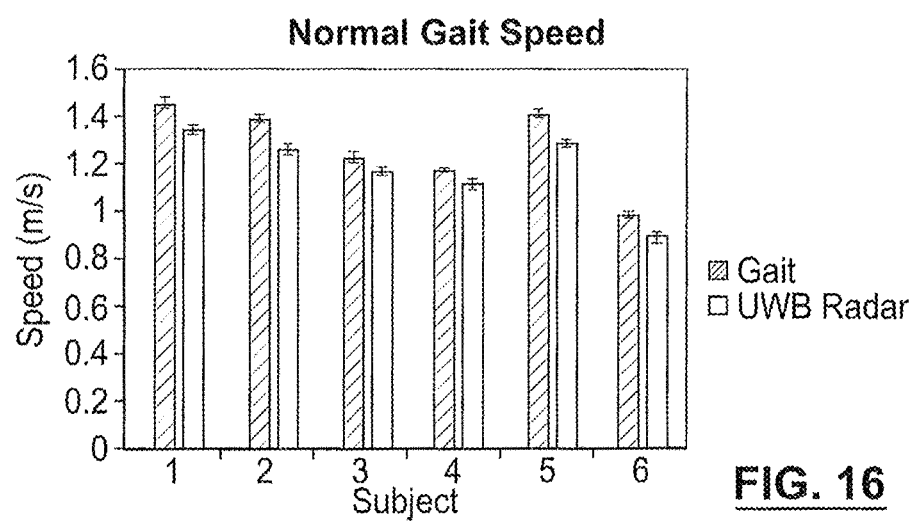
FIG. 16 illustrates the mean and standard variance for normal gait speed.
Figure 17:
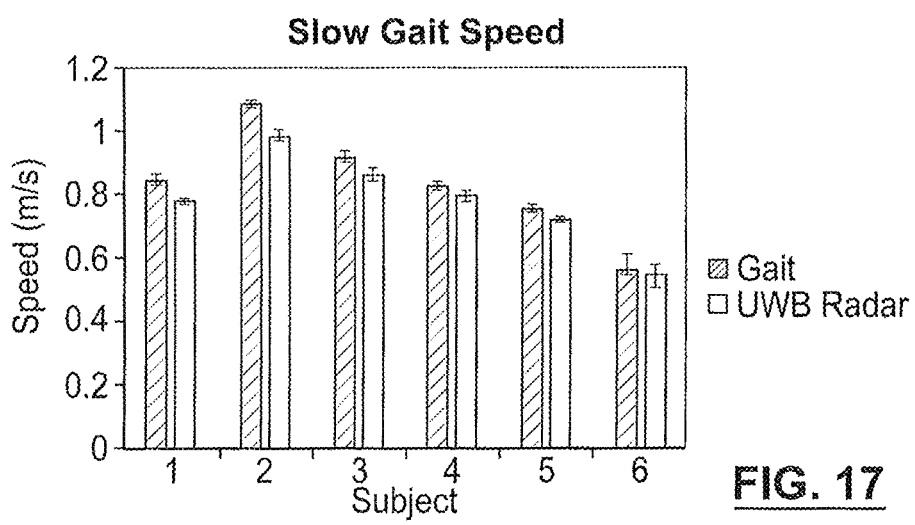
FIG. 17 illustrates the mean and standard variation for slow gait speed.

FIGS. 15 to 17 show the extracted velocity, along with the mean and standard variance for fast, normal and slow gait speed velocities respectively. It can be seen that on average the velocity captured by the UWB radar is in good correlation with the ground truth reported by the GAITRite. In addition, the standard deviation for each subject at all speeds for the UWB is relatively small which signifies that the values are close to the mean. Overall, the results achieved were able to differentiate between the different walking speeds. This information is crucial for detecting significant and subtle changes in velocities when tracking older adult's gait speed.

Figure 18:
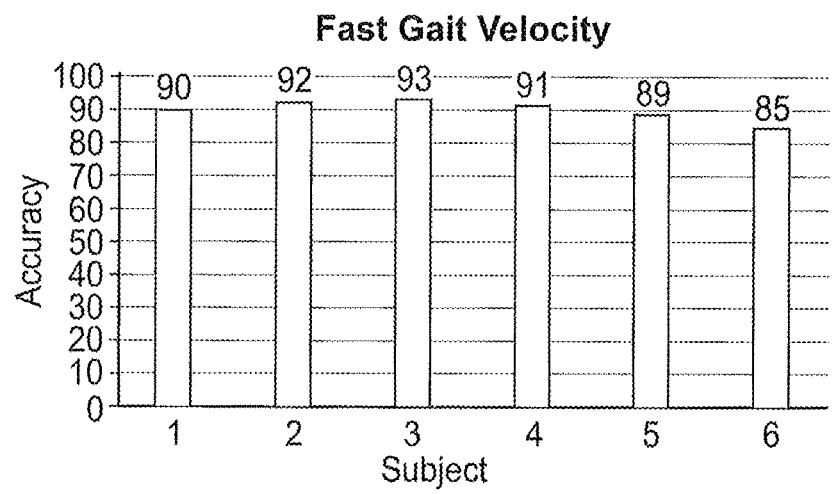
FIGS. 18 to 20 illustrate the accuracy of the system gate velocity estimation for fast, normal and slow gain speeds.
Figure 19:
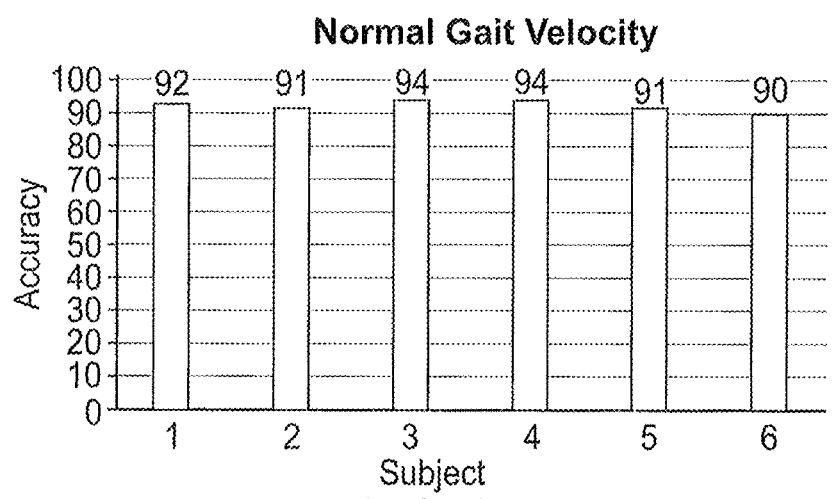
Figure 20:
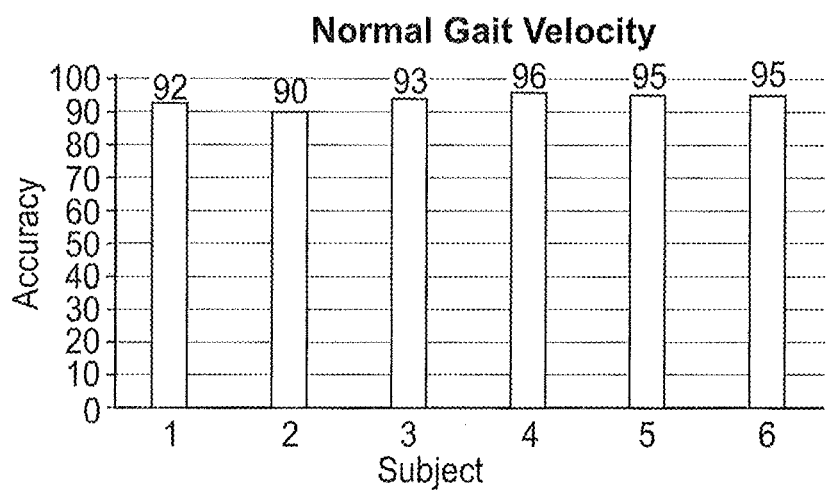

The system was also evaluated for the UWB radar in comparison to the standard GAITRite test. To do so, each person's results over ten runs were averaged to reduce the variability then plotted the accuracy of gait velocity compared with respect to the GAITRite results; fast normal and slow respectively for different subjects in FIGS. 18 to 20 show the accuracy of the fast, normal, and slow gait velocity when compared to the GAITRite ground truth. This comparison showed the accuracy of the UWB radar to be between 85% and 96%. More specifically, for fast, normal and slow walking speeds, the accuracy yields between 85% and 93%, 90% and 94%, 90% and 96% respectively.

Using simple processing algorithm that can run on a low-cost controller, the radar system may achieve high accuracy in gait velocity estimation. This system is non-obtrusive and has no privacy concerns, plus it can be repurposed for other applications, as outlined herein when not being used for gait measurements. The system can be controlled by a small computer, which in turn may connect to a cloud server to store gait velocity data. Other configurations are possible, including storing the measurements in databases or other data storage operatively connected to the system. The system may provide for a low cost solution with wide deployment in physiotherapy clinics, nursing and retirement homes, and the like.

In addition to biometric solutions, the system may also provide for environmental sensing solutions. Realizing a low-cost, compact gas sensor with high accuracy remains an arduous challenge. Due to the prevalence of volatile compounds in industrial and household products, there is a need to find an alternative to currently available gas sensors, which are relatively expensive and limited in portability. Explosive detection has become a necessary inspection process at airports and border controls as an active safety measure for counter-terrorism. Current methods of explosive detection, while generally effective, have their limitations. The use of colorimetric and spectrometry techniques, for example, are expensive and require time to confirm the presence of explosives.

The system and method disclosed herein use mm-Wave radars coupled with carbon nanotube-based gas-sensing films for trace detection of explosives. The proposed system and method is low-cost, compact, highly accurate, and offers continuous real-time detection.

Recently, there has been development of wireless carbon nanotube devices for next-generation gas sensors. Carbon nanotubes (CNT) possess electrical properties that are highly sensitive to small concentrations of gases, such as ammonia (NH3) and carbon dioxide (CO2). Specific characteristics of carbon nanotubes, such as their high surface absorptivity, high surface area-to-volume ratio, and quick response time, allow them to outperform conventional gas sensing mediums.

Conventional solutions have focused on development of CNT sensors operating at RF ranges. In some cases, it has been proposed to build RFID modules operating around UHF frequencies using conductive ink loaded with carbon nanotubes. In general, the sensing parameters of these designs rely on variations in CNT properties loading an antenna triggering an impedance mismatch between the antenna and CNT layers. Other conventional solutions have focused on carbon nanotubes sensing applications at microwave frequencies up to 30 GHz, where the exposure of CNTs to some gas will trigger a change in dielectric properties/loading conditions, and thus causing a change in the system resonance frequency. Although these solutions appear to result in good sensitivity in the high parts per million range (ppm). A high accuracy low-cost gas sensor in the low parts per billion (ppb) is still desirable.

In this disclosure, an aspect of the system includes printing of CNTs on paper substrates for low cost gas sensing at 57 GHz to 64 GHz utilizing a compact mm-Wave radar.

Machine learning algorithms are incorporated to facilitate the realization of a working high-sensitivity real-time gas sensing system.

Radars traditionally have been used to detect objects like aircraft, motor vehicles, and terrain by transmitting electromagnetic radiation in the radio and microwave domains, and then measuring the properties of the backscattered waves to determine the range, angle of reflection, and velocity of the object. Recently, though, the integration of digital signal processing (DSP) algorithms and machine learning in radar systems has enabled exploration of radar's uses in other applications. For example, radar systems have been used for gesture recognition, 18 as well as low-cost biometric identification systems that use alternative radar techniques to solve traditional issues with authentication.

The selection of paper substrates are intended to represent a green low-cost viable solution to host inkjet-printed CNTs. In this case, the paper substrates were characterized utilizing multiple techniques up to 67 GHz.

Carbon nanotubes (CNTs) are bundles of rolled-up graphene with unique intrinsic properties. They have been intensively investigated as part of next-generation gas sensors due to their sensitivity to small quantities of gases. Upon exposure to gaseous compounds, the electronic properties of CNTs change significantly. CNTs also possess high surface adsorption and a high surface area-to-volume ratio. These properties promote absorption of gases and lead to good sensitivity at low gas concentrations.

Carbon nanotubes are cylindrical nanostructures of carbon with remarkable intrinsic mechanical and electrical properties. Notably, semi-conducting CNTs have the potential to be more conductive than copper due to their ability to transport electrons over long lengths without interruption. Carbon nanotubes are suitable for gas sensing applications since their electrical properties, such as conductivity and permittivity, are modified in the presence of small quantities of gases, and their high surface absorption promotes gas adhesion on the CNT structure. The presence of reactive gases, such as ammonia and methane, induce electron transfers between the gas molecule and defects within the CNT walls, which triggers variations in its charge carrier densities. This reaction forms the basis for CNT in gas sensing applications.

Another noteworthy aspect of CNTs is that their intrinsic properties can be further enhanced via chemical functionalization, usually with a polymer or ligand. Exploiting this behavior, the system used poly m-aminobenzene sulfonic acid (PABS) functionalized single-walled carbon nanotubes (SWCNT) as the gas sensing material. PABS-SWCNT is an aqueous compound composed of SWCNT covalently bonded with the PABS polymer through an amide functionalization. PABS-SWCNT was selected due to its sensitivity and selectivity towards ammonia gas. Other acid and nanotube combination may be used. Ammonia is an accessible volatile compound commonly found in explosives. Therefore, it is a suitable candidate for testing explosive detection. Ammonia interacts with PABS-SWCNT by removing a proton from the PABS functional group attached to the CNT, which induces a charge transfer between the CNT and the PABS side chain. CNT gains electrons, and consequently, its valence band is refilled by the excess electrons leading to reduced conductivity.

The powdered CNTs were dispersed into an aqueous solution at a concentration of approximately 5 mg/mL. The dispersion underwent ultra-sonication for 2 hours. The PABS functionalization was selected to improve the CNTs selectivity and sensitivity towards ammonia, which was selected for its toxicity and prevalence in households. The presence of PABS was intended to improve the absorption of NH3 on the CNT. NH3 is an electron donor, and will result in a charge transfer upon contact with CNT. Electrons transferred into the CNT will fill up its bandgap and reduce its electrical conductivity. The sonicated CNT were deposited on paper substrates. Multiple shapes were investigated to optimize for ammonia sensitivity.

Figure 21:
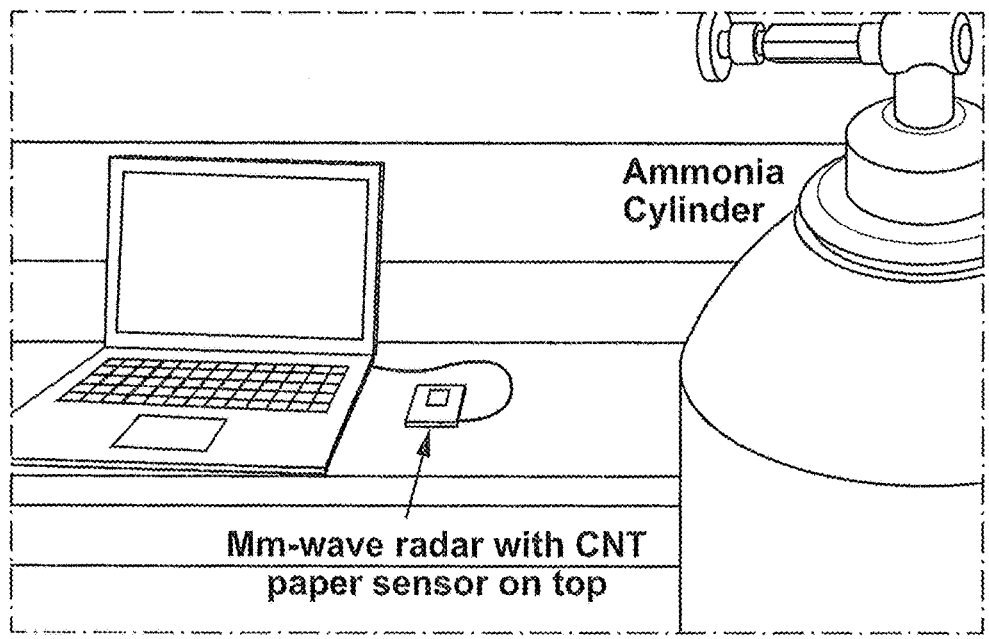
FIG. 21 illustrates a setup for real-time gas sensing measurements.

Further tests of the system concept were conducted using an 4-port 67 GHz VNA, where one antenna was utilized as a Tx and 3 others were utilized as Rx to properly assess the different scattering properties of the CNT-based scatters. Next, a low-cost compact 8 channel (2 Tx, 4 Rx) frequency-modulated continuous wave (FMCW) radar operating in the 57-64 GHz range as a system proof-of-concept. The radar is confined inside a 7 cm×5 cm×1.3 cm box with a one wavelength (at 60 GHz) distance between the surface of the eight internal printed planar antennas and the enclosure top. To enable real-time monitoring, the radar is connected to a computer and a machine learning (ML) library is invoked (FIG. 21). ML is initially trained with feature data generated from the radar using a random forest classifier. The feature data (i.e. range, total energy received from the returning radar signal, spatial dispersion, along with the IQ data for each channel) quantifies the magnitudes and phase changes from backscattered waves received by the radar. During the training stages, the CNT films were placed flat on top of the enclosure with the CNT side facing up. In addition, several radar measurements were taken with the same CNT film, each time having it randomly oriented and angled differently to train the system to account for possible non-uniformity of the CNT deposition or misalignments in future measurements.

Apart from the several CNT characterization measurements that were performed from DC to 67 GHz using multi-meters, four point probes, and VNAs, the system ran a set of measurements on the magnitudes and phases of the backscattered signals from the CNT films using the FMWC radar after exposure to no ammonia, low concentrations of ammonia, and high concentrations of ammonia. Between exposure to low and high ammonia concentrations, the CNT films were left to recover under ambient vacuum conditions. DC resistance and backscattered signals in the V-band were measured again before re-exposure to ammonia to verify that the CNT films had recovered to the conditions prior to ammonia exposure.

Figure 22:
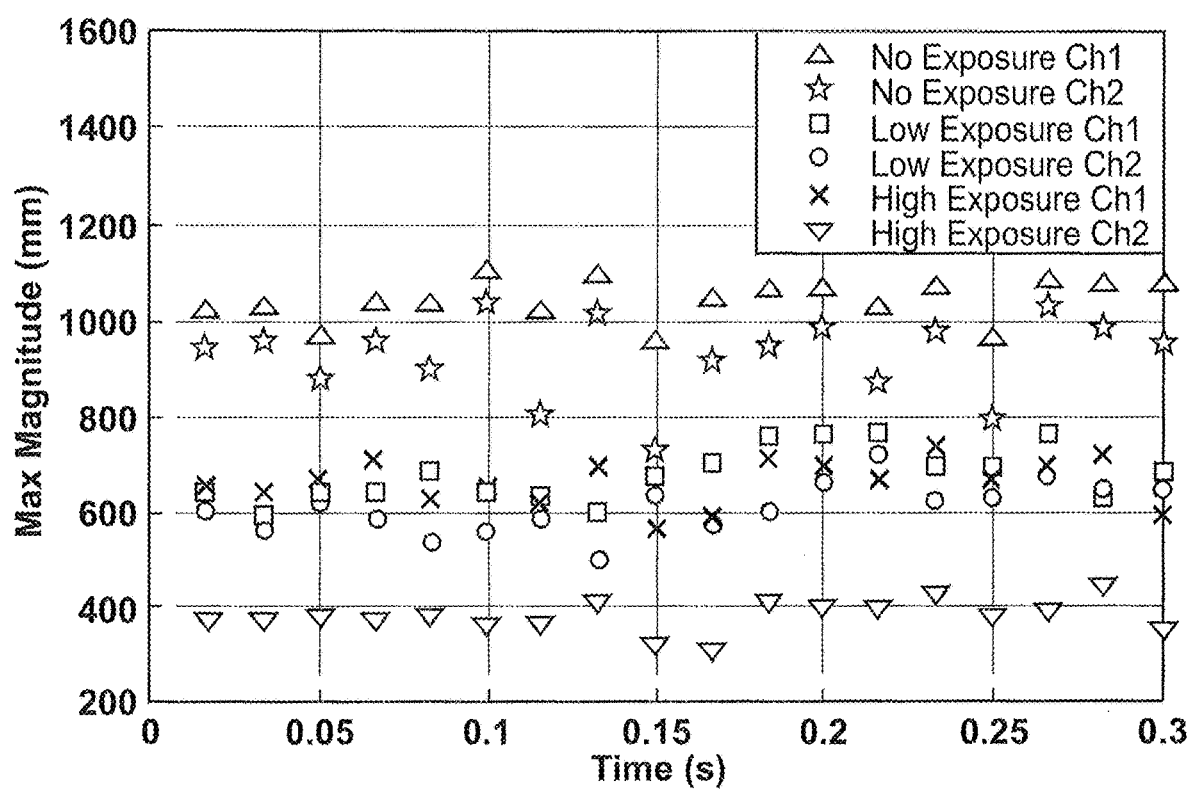
FIG. 22 illustrates radar measured backscattered signals from the carbon nanotubes.

In FIG. 22, the magnitudes of the backscattered signals for all three exposure scenarios are plotted. For readability, the output plotted contain two of the eight channels on the radar. Considerable differences between the plots for the backscattered signals for different ammonia exposures across each channel are observed, allowing the machine learning algorithm to autonomously distinguish various levels of exposure.

By incorporating machine-learning algorithms, and utilizing backscattering principals, the system has demonstrated the potential of using a 60 GHz radar sensor for real-time low-cost gas monitoring. By detecting the differences between the backscattered signals, the system can differentiate between different cases of ammonia exposure. The larger the number of the channels used on the radar, the better our system resolution. Notably, invoking the ML training algorithms, the system may achieve autonomous identification of the level of ammonia during exposure with an accuracy of more than 90%, while allowing for different potential misalignments between the radar and the printed functionalized CNTs.

Figure 23:
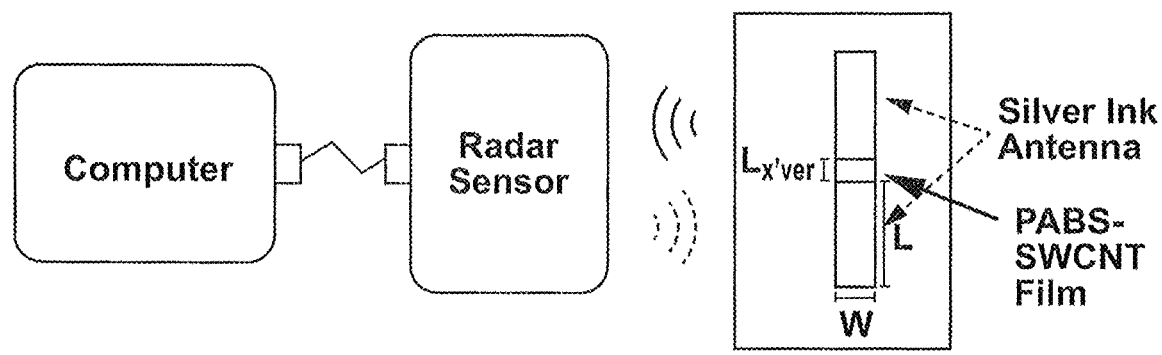
FIG. 23 illustrates a basic schematic of the gas-sensing system.
Figure 24:
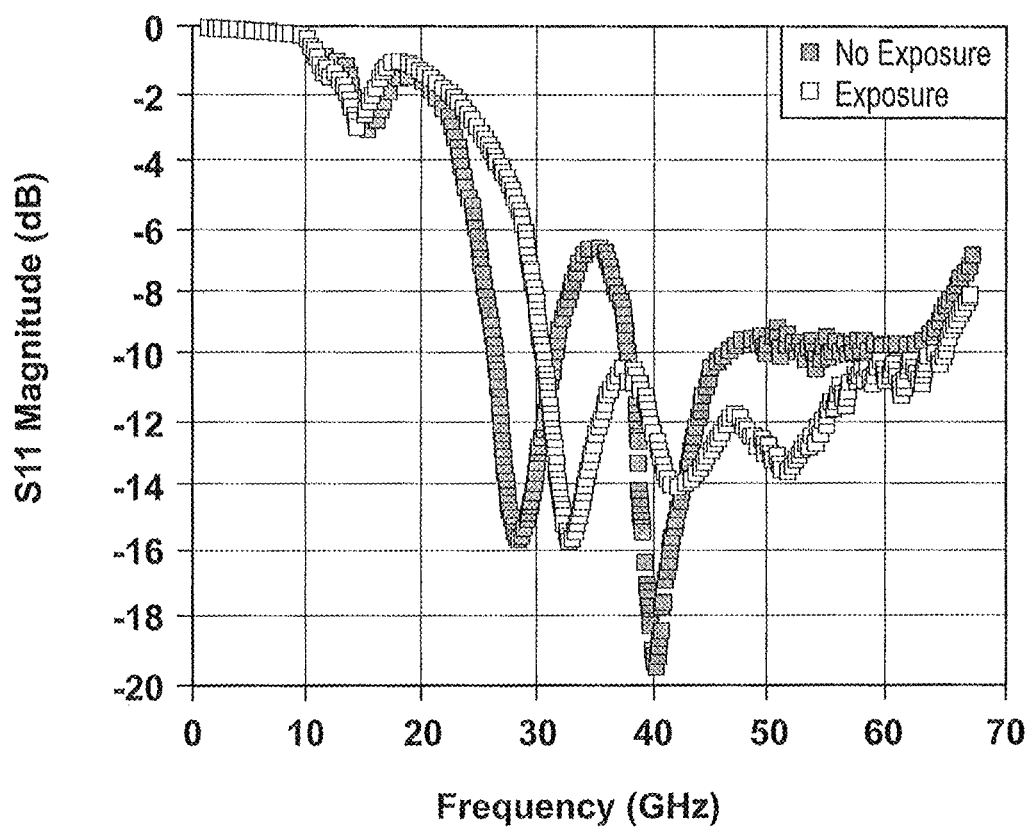
FIG. 24 illustrates a reflection coefficient at the connector coaxial feed before and after ammonia exposure.

Prior to implementing the proposed system as shown in FIG. 23, the RF scattering properties of deposited CNT on paper substrates were verified. This was done through a Keysight N5227A PNA-67 GHz four-port Microwave Network Analyzer. It will be understood that VNA or PNA may be used for verification. A sample of CNT deposited on paper was fitted between the two electrodes of a 1.85 mm V-band connector. The film was fabricated by printing silver ink to form a transmission line coupon of coplanar strip lines on the photo paper. A layer of PABS-SWCNT was deposited in the gap between the transmission lines, ensuring contact with the silver at its edges. FIG. 24 depicts the magnitude observed from the coaxial feed of the 1.85 mm V-band connector with CNT before gas exposure and with CNT after gas exposure. The CNT sample was exposed to an ammonia concentration of 30 ppm for about 15 seconds. The dimensions of the CNT sample measured at 1 mm×2 mm. It is evident that the exposure to ammonia readily changes the RF properties of the CNT sample, which is observed in changes in the input reflection coefficients and phase. The change is most significant near the 30-40 GHz range (corresponding to the electrode lengths using the V-band connectors), where a resonance frequency shift of 4 GHz is observed after ammonia exposure.

The proposed explosive detection system consists of a mm-Wave radar sensor interrogating the backscattered signals radiated from a gas-sensing film. The gas-sensing film is composed of coplanar half-dipole antenna pairs printed on photo paper substrate. A gap between the antenna pairs is left and loaded with a sample of CNT. The gas-sensing film can be placed on top of the radar sensor or at a distance away. The radar sensor transmits mm-Waves and records the changes in the reflected backscattered signals to determine trace ammonia concentrations in the environment. Upon exposure to ammonia, a variation in the CNT conductivity occurs, which triggers a corresponding variation in the resonant frequency of the system. Consequently, changing the system resonance frequency alters the scattered energy from the antenna pairs, between exposure, to different concentration levels. A supervised machine learning scheme is then used to build a classification model of different concentrations by mapping the measured radar readings into the correct ammonia concentrations.

It will be understood that additional data metrics may also available in the radar's digital signal processing (DSP) pipeline were used as a control to validate the recorded measurements.

The gas-sensing films were composed of dipole array silver-inkjet printed onto photo paper followed by CNT loaded in the gap left between the dipoles. The array of half-wave dipoles with resonant frequency of 60 GHz was printed on a 7 cm×5 cm photo paper as shown in FIG. 25.

A random forest classifier scheme was invoked to map the backscattered signal measurements to the correct ammonia concentrations. Random forest classifier is a supervised machine learning algorithm composed of a collection of decision trees used to classify data into discrete categories. The decision trees work by mapping the observations of an object, such as the magnitude and phase of backscattered signals, to predictions about the target value of the object, such as the ammonia gas concentration. At the end of the random forest process, the most recurring prediction reached by all decision trees is outputted as the object's predicted value.

Initially, all the measurements taken by the radar sensor were used as training data to build classification models by mapping the measurements to gas concentrations known a priori. The random forest classification models are then invoked while the radar sensor is recording measurements to predict the gas concentration exposed to the gas-sensing films in real time. To describe the performance of the classification models, confusion matrices were used to show the percent likelihoods of different combinations of true and predicted values. The accuracy of the classification models is expressed as the percent likelihoods of returning the correct prediction, such as when the true and predicted values coincide in the confusion matrix. It is noted that the accuracy of the classification model is dependent on the number of overlaps in the training data sets between different gas concentrations. The more distinct the data measurements, the easier it may be for the classification model to discriminate between different gas concentrations.

Figure 26:
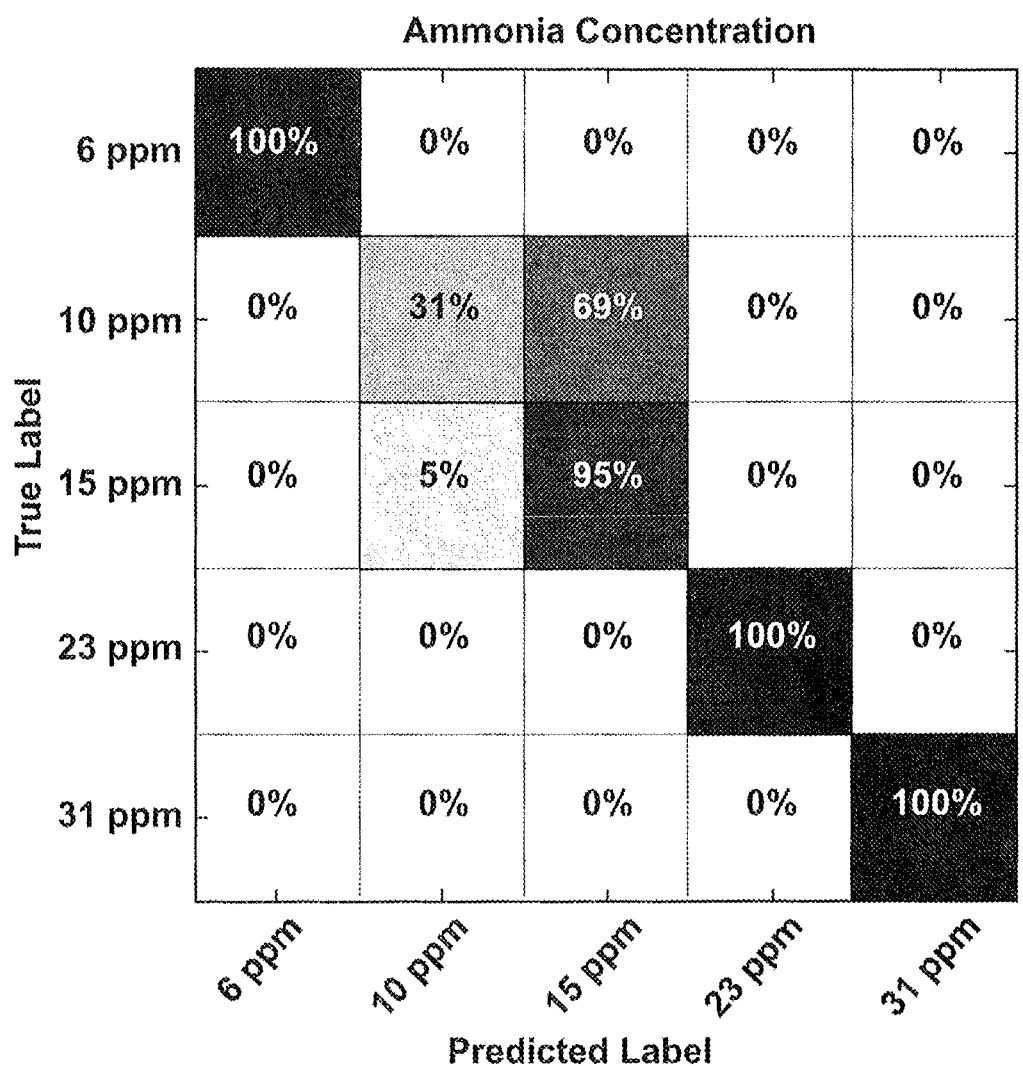
FIG. 26 illustrates a confusion matrix generated using backscattered signal from one CNT loaded dipole.

Initial tests were conducted exposing just one CNT-loaded dipole to various low concentrations of household ammonia for 10 seconds. After exposure and recording measurements, the gas-sensing film was left to recover to non-exposure conditions under an ambient vacuum. FIG. 26 illustrates the classification results for this case. It is clear that the model has difficulty discriminating between 10 ppm and 15 ppm concentrations, but achieves excellent accuracy otherwise.

Figure 27:
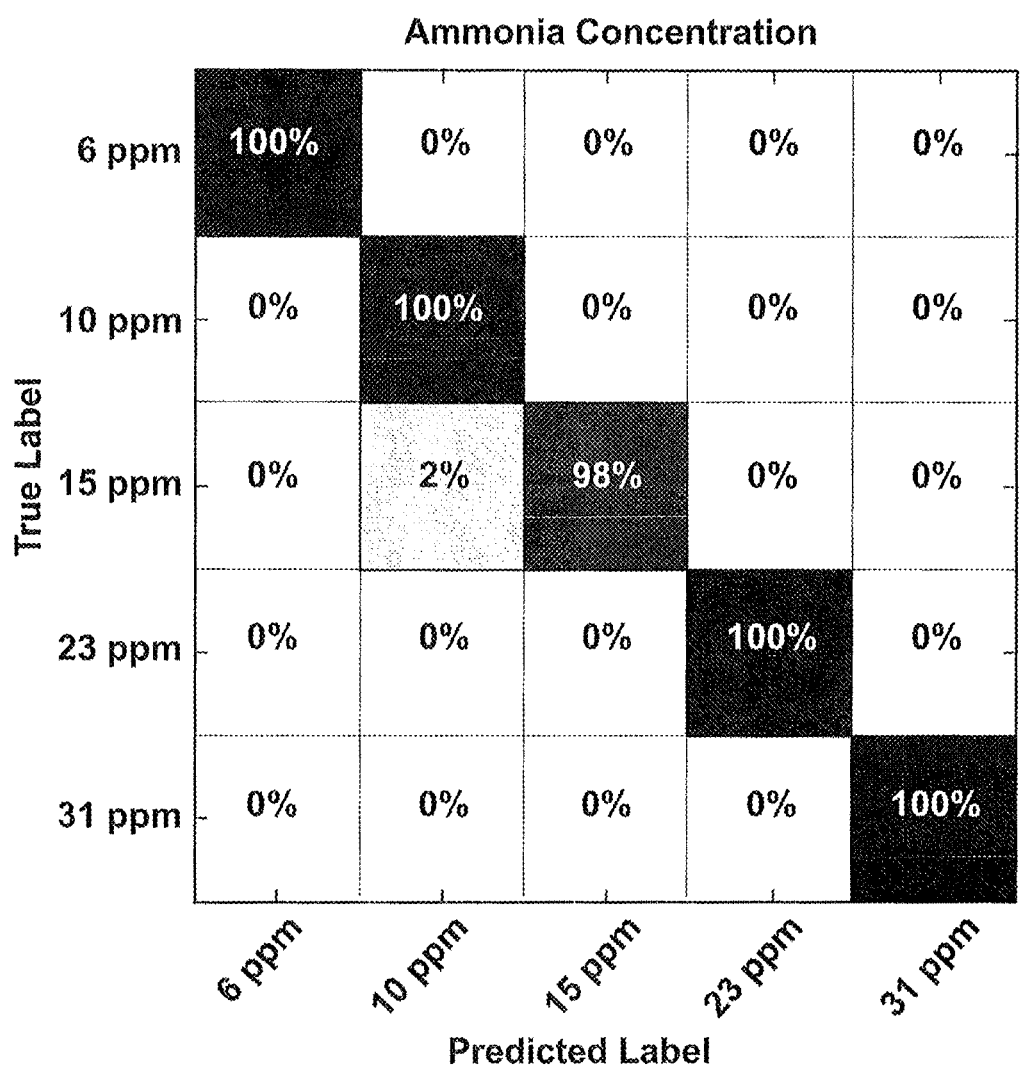
FIG. 27 illustrates a confusion matrix generated using the back scattered signal from the dipole array.

The same test was repeated using the dipole array, rather than just one element. FIG. 27 depicts a much improved accuracy using the loaded dipole array.

The system has demonstrated the viability of using a mm-Wave radar sensor for wireless remote explosives detection. By interrogating a CNT-loaded paper gas-sensing film, the mm-Wave radar sensor records the measured backscattered signals to discriminate between trace ammonia concentrations. The resulting confusion matrices achieved with both the single loaded dipole and the loaded array were also repeatable across multiple trials. The resonant array was shown to have greater resolution and sensing accuracy over the single dipole. With this proof-of-concept system, we can easily differentiate between trace ammonia concentrations at the low ppm range with a high accuracy.

Figure 28:
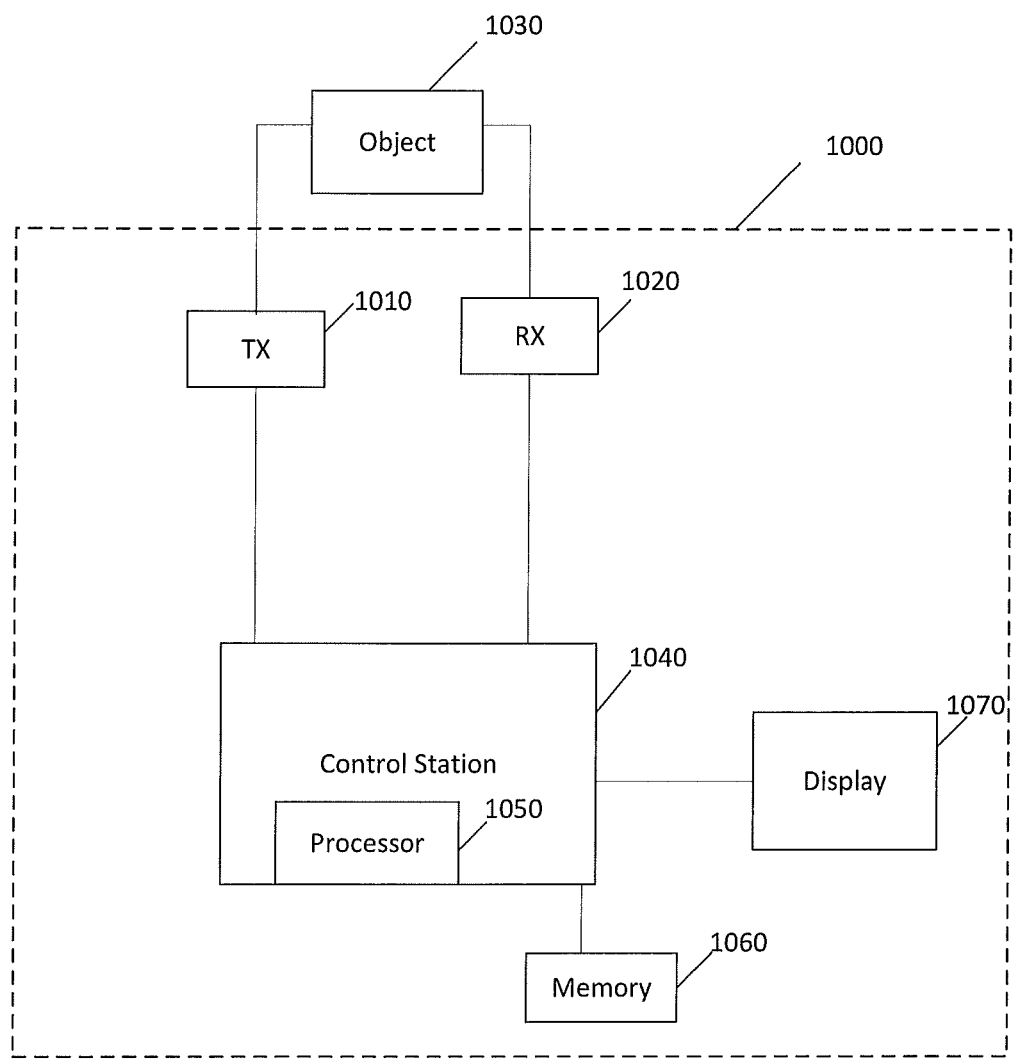
FIG. 28 illustrates a system for sensing according to an embodiment.

FIG. 28 illustrates a sensing system 1000 for sensing biometric and environmental characteristics. In particular, the system 1000 includes at least one transmitter 1010 and at least one receiver 1020. The transmitter 1010 is configured to transmit electromagnetic waves at a frequency generally between 30 GHz and 300 GHz or an appropriate subset of this frequency range depending on the required functionality. In some cases, the at least one transmitter 1010 may be a 2 channel transmitter configured to transmit between 30 to 67 GHz. The transmitter is intended to transmit electromagnetic waves at an object 1030 to determine a characteristic of interest. In some cases, the characteristic may be a biometric characteristic, for example, a fingerprint, a palm print, a respiration rate, a heart rate, a glucose level, a gait velocity, a stride length or the like. In other cases, the characteristic may be environmental, for example, presence of impurities, air quality, explosive detection, or the like.

Once the electromagnetic waves that have interacted with the object 1030 are received at the receiver 1020, the data may be transmitted to a control station 1040. The control station 1040 may be, for example, a computer, a purpose-built device, or other device configured to receive and analyze the data. The control station 1040 includes at least one processor 1050 configured to carry out computer-readable instructions with respect to the data received. The data received may be reviewed and may have various processes or algorithms applied to it. In some cases, a decision tree may be generated to better analyze the characteristics of the object in question.

The system 1000 may also include a memory component 1060 used for example, for storing data, computer instructions, programs, machine learning and the like. The memory component 1060 may also or alternatively be an external database, cloud storage or the like. The system 1000 may also include a display 1070 and/or other user interface components in order to view and/or interact with results of the analysis. In other cases, for example in fingerprint detection, the result may simply be the unlocking or granted access for the individual and no display may be included in the system.

Figure 29:
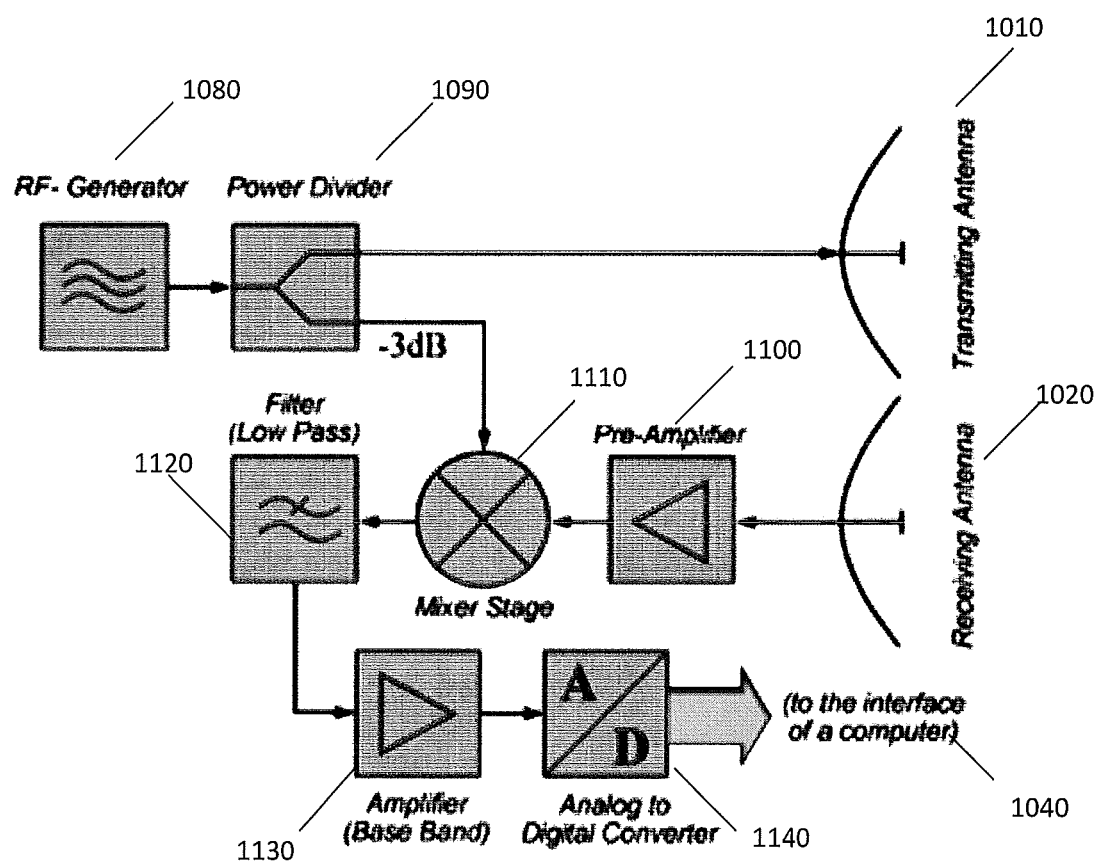
FIG. 29 illustrates further detail of the system shown in FIG. 28.

FIG. 29 provides further detail with respect to the system 1000. In some embodiments, a signal is provided to the transmitter 1010 (shown as a transmitting antenna) via an RF Generator 1080. In some cases, the signal is passed through a power divider 1090 to the transmitter 1010. The reflected signal is received at the receiver 1020 (shown as a receiving antenna) and provided to a pre-amplifier 1100. The signal is then combined with the signal from the transmitter (via the power divider 1090) to provide for a result, via for example a mixer 1110. The power divider 1090 may provide for signal adjustment prior to providing the signal to be combined. In some cases, the signal bay be reduced/attenuated by 3 dB, although other adjustments/reductions in amplitude may also be used.

Once the signal results are obtained, the signal results may be filtered by a filter 1120, for example a low pass filter. The signal may then be amplified by an amplifier 1130 and converted to a digital signal by an analog to digital converter 1140. Once a digital signal, it can be further processed by the control station 1040.

Figure 30:
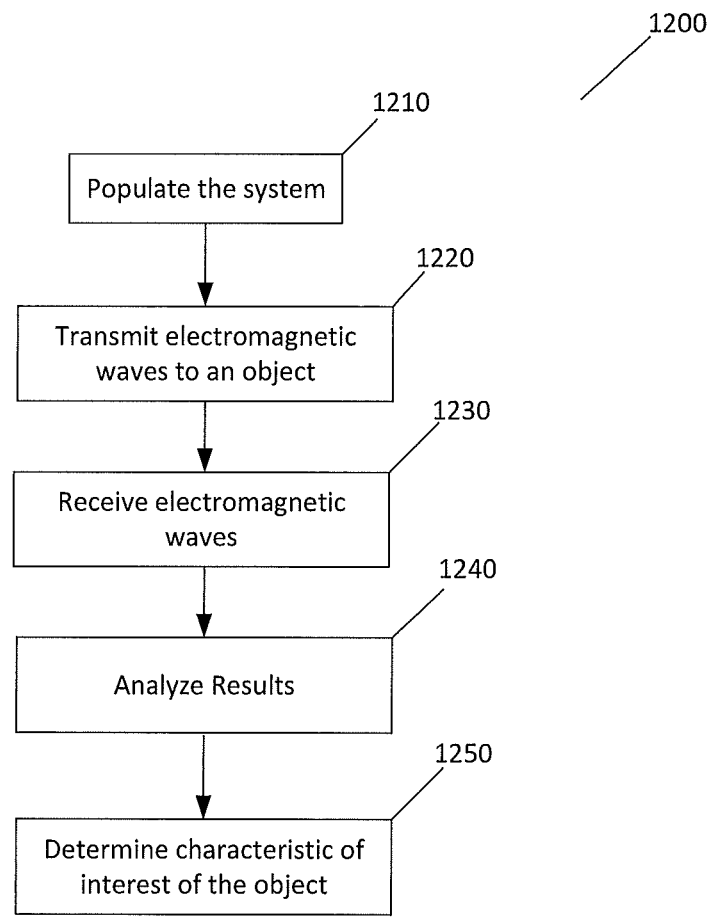
FIG. 30 illustrates a method for sensing according to an embodiment.

FIG. 30 illustrates a method 1200 for sensing biometric and environmental characteristics. The sensing system 1000 may be populated or pre-populated with data related to the characteristic of interest, at 1210. For example, if the system 1000 is intended to sense fingerprints to allow authorization to certain individuals, results for the individuals may be pre-populated to the system 1000. It will be understood that this may occur during a setup of the system 1000 or may re-occur when other data becomes relevant to the system 1000. For example, a new individual is granted access or a previously authorized individual is removed from the authorization. The system 1000 is unlikely to be populated each time the method 1100 is run by the system.

At 1220, the transmitter transmits electromagnetic waves to an object to determine a characteristic of interest. It is intended that the electromagnetic waves are between 30 GHz and 300 GHz. At 1230, the waves are then received by the at least one receiver configured to receive the electromagnetic waves from the transmitter. The transmitter and receiver are positioned in relation to an object to be scanned such that the receiver receives electromagnetic waves (for example, reflected) in order to determine the characteristic of interest of the object.

At 1240, the results are analyzed. In some cases, the results may be analyzed using machine learning. In other cases, other analysis may be performed to determine whether the characteristic of interest is present in the object.

At 1250, the system 1000 makes a decision as to whether the characteristic of interest is present. For example, in detecting ammonia, the system 1000 may determine whether there is presence of ammonia to a predetermined threshold or if there is no ammonia detected.

Figure 31:
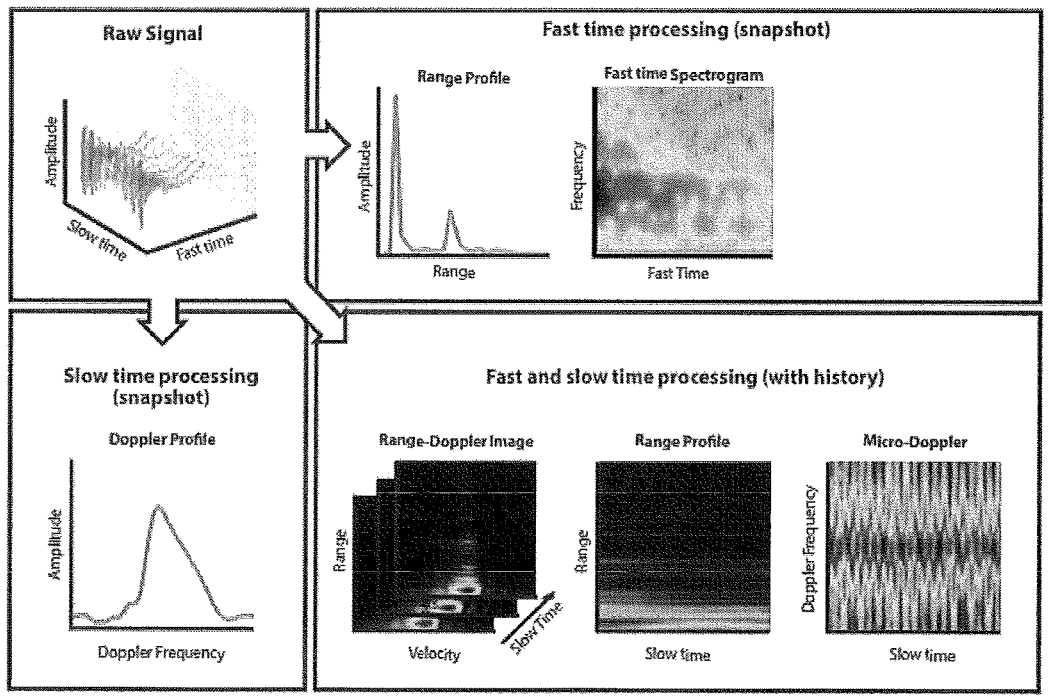
FIG. 31 illustrates signal processing according to an embodiment.

FIG. 31 illustrates various signal processing techniques/approaches that can be used by the system to analyze the data received. It will be understood that depending on the particular application, the history and the processing of the data, various differing results may be obtained.

Figure 32:
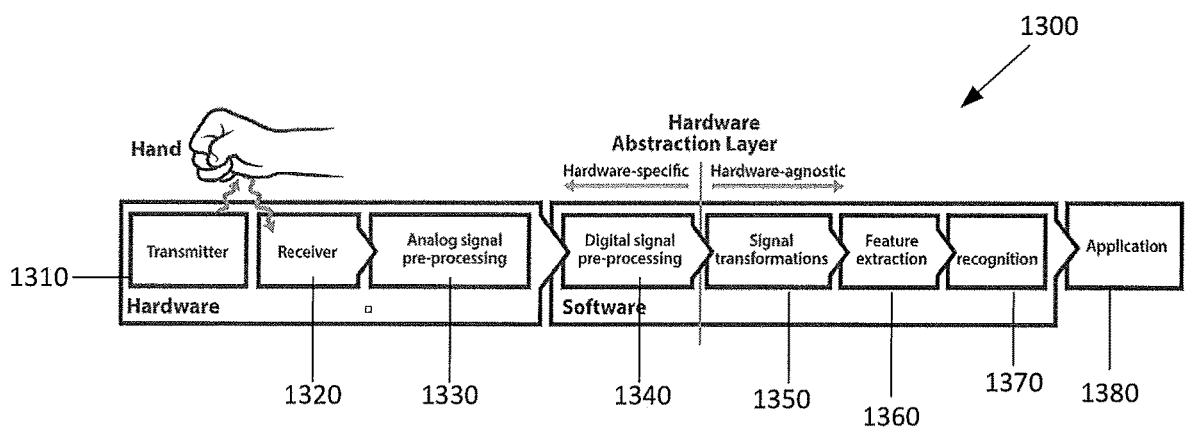
FIG. 32 illustrates a method for sensing according to an alternative embodiment.

FIG. 32 illustrates a method 1300 for sensing biometrics, and in particular a palm print using an embodiment of the system detailed herein. At 1310, the signal is transmitted by a transmitter, the signal reflects off a hand, and at 1320 the signal is received by a receiver. At 1330, the signal is provided to the system for analog pre-processing. At 1340 the analog signal has been converted to a digital signal (see D/A converter above) and is digital pre-processed by the system. At 1350 signal transformations are completed by the system. At 1360, the system may perform feature extraction in relation to characteristics of interest with respect to the palm print. At 1370, the system provides recognition/non-recognition with respect to the characteristics of interest and is able to determine whether the palm print is, for example, an authorized palm print. At 1380, the system provides the results to the application, for example, opening a door, turning on a phone, opening secure software, or the like.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the embodiments can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:
1. A biometric sensor comprising:
   a transmitter configured to transmit electromagnetic waves between 1 GHz and 300 GHz;
   a receiver configured to receive the electromagnetic waves from the transmitter,
   wherein the transmitter and receiver are positioned in relation to a stationary object to be scanned such that the receiver receives reflected electromagnetic waves, and wherein the stationary object to be scanned is a palm of a human being;

wherein the system is configured to apply signal processing algorithms to the received reflected electromagnetic waves in order to produce a three-dimensional scattered image of internal features of the palm and identify the human being; and
- a second biometric sensor for two-factor authentication, wherein the second biometric sensor is selected from a group consisting of an optical sensor, an infrared sensor, a laser sensor, a camera sensor or an ultrasonic sensor;
- wherein the internal features of the palm are different from one human being to another under the transmitted electromagnetic waves.

2. A sensor according to claim 1 further comprising a control station configured to analyze the scanned palm to determine a characteristic of interest related to the palm.

3. A sensor according to claim 1 wherein the sensor determines whether the two-factor authentication allows authorization of the human being to an application based on the identification of the palm of the human being.

4. A method for sensing comprising:
- transmitting, by a transmitter, electromagnetic waves between 1 Ghz and 300 GHz towards a stationary object, wherein the stationary object is a palm of a human being;
- receiving, by a receiver, reflected electromagnetic waves from the palm; and
- analyzing the electromagnetic waves and reflected electromagnetic waves to produce a three-dimensional scattered image of internal features of the palm and determine a characteristic of interest associated with the palm, wherein the internal features of the palm are different from one human being to another under the transmitted electromagnetic waves;
- measuring the characteristic of interest associated with the palm via a second biometric sensor for a two-level check.

5. A method according to claim 4 wherein analyzing the electromagnetic waves and reflected electromagnetic waves comprises combining the electromagnetic and reflected electromagnetic waves to produce an analog signal result.

6. A method according to claim 5 further comprising converting the analog signal to a digital signal to be further analyzed at a control station.

7. A method according to claim 6 wherein the control station is configured to analyze the signal using machine learning.

8. A method according to claim 6 wherein the control station is configured to analyze the signal using decision trees.

9. The sensor of claim 1 wherein the received reflected electromagnetic waves are mm-waves.

10. The method of claim 5 wherein the electromagnetic waves and the received reflected electromagnetic waves are mm-waves.

* * * * *